United States Patent
Miki et al.

(10) Patent No.: US 11,279,653 B2
(45) Date of Patent: Mar. 22, 2022

(54) METHOD FOR MANUFACTURING GLASS PANEL, AND GLASS PANEL

(71) Applicant: NIPPON SHEET GLASS COMPANY, LIMITED, Tokyo (JP)

(72) Inventors: Atsushi Miki, Tokyo (JP); Tetsuo Minaai, Tokyo (JP); Tatsuhiro Nakazawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/762,052

(22) PCT Filed: Nov. 6, 2018

(86) PCT No.: PCT/JP2018/041181
§ 371 (c)(1),
(2) Date: May 6, 2020

(87) PCT Pub. No.: WO2019/093324
PCT Pub. Date: May 16, 2019

(65) Prior Publication Data
US 2020/0270175 A1 Aug. 27, 2020

(30) Foreign Application Priority Data
Nov. 10, 2017 (JP) .............................. JP2017-217844

(51) Int. Cl.
*E06B 3/663* (2006.01)
*C03C 27/08* (2006.01)

(52) U.S. Cl.
CPC .......... *C03C 27/08* (2013.01); *E06B 3/66304* (2013.01); *E06B 3/66342* (2013.01); *E06B 3/66352* (2013.01)

(58) Field of Classification Search
CPC .. E06B 3/663; E06B 3/66304; E06B 3/66342; E06B 3/66352; E06B 3/673;
(Continued)

(56) References Cited

U.S. PATENT DOCUMENTS 2,235,681 A * 3/1941 Haven ................. E06B 3/66342
428/34
2,283,253 A * 5/1942 Haven ................. E06B 3/67334
118/63

FOREIGN PATENT DOCUMENTS

JP 2002-167241 A 6/2002

OTHER PUBLICATIONS

International Search Report issued in Application No. PCT/JP2018/041181, dated Jan. 15, 2019.

* cited by examiner

*Primary Examiner* — Donald J Loney
(74) *Attorney, Agent, or Firm* — Michael Best & Friedrich LLP

(57) ABSTRACT

An object is to enable sealing of a peripheral portion of a glass panel with less effort and time. A first metal introduction device 5A is moved from one first corner A at which two sides intersect each other of a pair of rectangular glass plates, toward another end of a first side Vab of the two sides, while performing filling with a metal material. Before the metal material filling the first corner A is solidified, a second metal introduction device 5B is moved from the first corner A toward another end of another second side Vad, while performing filling with a metal material. After the first side Vab and the second side Vad are filled with the metal material, both glass plates are rotated by 180 degrees, and the first metal introduction device 5A is moved toward another end of a fourth side Vcd of two sides intersecting each other at a second corner C diagonal to the first corner (Continued)

A, while performing filling with a metal material. Before the metal material filling the second corner C is solidified, the second metal introduction device 5B is moved from the second corner C toward another end of another third side Vbc, while performing filling with a metal material.

6 Claims, 16 Drawing Sheets

(58) Field of Classification Search
CPC ............. E06B 3/67334; E06B 3/67365; E06B 2003/67378
See application file for complete search history.

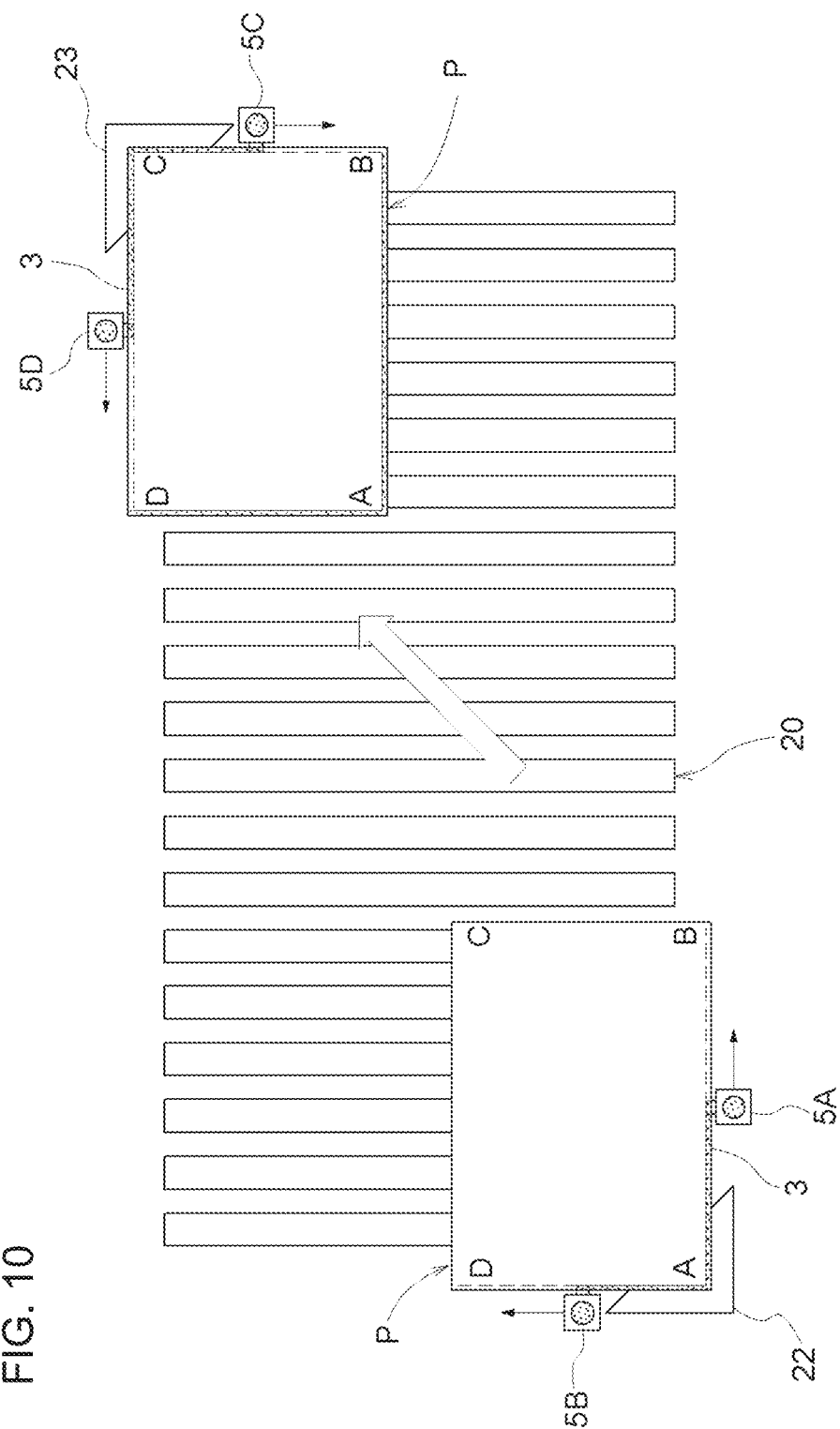

METHOD FOR MANUFACTURING GLASS PANEL, AND GLASS PANEL

TECHNICAL FIELD

The present invention relates to a method for manufacturing a glass panel, in which a spacer is provided between a pair of glass plates each having a rectangular shape, to form a gap, and a peripheral portion of the pair of glass plates is filled with a melted metal material, so that the glass plates and the metal material are directly joined to each other and the gap is sealed in an airtight state, and also relates to the glass panel.

BACKGROUND ART

Conventionally, there has been a method in which a metal introduction device which fills a peripheral portion of both glass plates with a melted metal material while moving from one end to another end of one side of the glass plates is provided and each side is sealed by the metal material, whereby the gap is made airtight (see, for example, Patent Document 1).

CITATION LIST

Patent Documents

[PATENT DOCUMENT 1] Japanese Laid-Open Patent Publication No. 2002-167241

SUMMARY OF THE INVENTION

Problems to be Solved by the Invention

In the conventional method described above, after the metal introduction device is moved along one side of the rectangular glass plates and fills the one side with a metal material, in order to move along a side different from the side filled with the metal, the direction of an introduction portion of the metal introduction device needs to be changed, and the metal introduction device needs to be transferred so as to change a movement path. Thus, there is a problem that a lot of effort and time are required.

In addition, even in the case where a plurality of metal introduction devices are provided so as to move along respective sides, when the entire size of the glass plates is changed, placement of each of these metal introduction devices needs to be changed to change the movement path, and therefore, also in this case, there is a problem that a lot of effort and time are required.

Accordingly, an object of the present invention is to solve the above problems and enable sealing of a peripheral portion of a glass panel with less effort and time.

Solution to the Problems

A method for manufacturing a glass panel according to a first aspect of the present invention is a method for manufacturing a glass panel, in which a spacer is provided between a pair of glass plates each having a rectangular shape, to form a gap, and a peripheral portion of the pair of glass plates is filled with a melted metal material, so that the glass plates and the metal material are directly joined to each other and the gap is sealed in an airtight state, the method including: providing a first metal introduction device and a second metal introduction device which individually move along two sides intersecting each other of the glass plates and fill the peripheral portion of the pair of glass plates with the melted metal material; in order to fill the peripheral portion of the pair of glass plates with the melted metal material, moving the first metal introduction device from one first corner at which two sides intersect each other of the glass plates, toward another end of a first side of the two sides, while performing filling with the metal material; before the metal material filling the first corner is solidified, moving the second metal introduction device from the first corner toward another end of another second side, while performing filling with the metal material; after the first side and the second side are filled with the metal material, rotating the pair of glass plates by 180 degrees so that the first corner and a second corner diagonal thereto of the pair of glass plates are switched with each other; moving the first metal introduction device toward another end of a third side of two sides intersecting each other at the second corner, while performing filling with the metal material; and before the metal material filling the second corner is solidified, moving the second metal introduction device from the second corner toward another end of another fourth side, while performing filling with the metal material.

According to the first aspect of the present invention, regarding four sides composed of a first side, a second side, a third side, and a fourth side of a pair of rectangular glass plates, after the first side is filled with melted metal by the first metal introduction device and the second side is filled with the melted metal by the second metal introduction device, it is possible to fill the third side and the fourth side with melted metal merely by rotating both glass plates by 180 degrees, without changing the metal introduction directions and the movement paths of the first metal introduction device and the second metal introduction device.

In addition, at the first corner at which the first side and the second side intersect each other and the second corner at which the third side and the fourth side intersect each other, before the filling metal material is solidified, filling with metal by another metal introduction device is started, whereby the two sides intersecting each other are filled with metal. Therefore, effort for heating management at each corner can be decreased.

Further, even if the size of the glass plates is changed, it is not necessary to change the metal introduction directions and the movement paths of the first metal introduction device and the second metal introduction device.

Therefore, it is possible to decrease effort and time for sealing the peripheral portion of the glass plates.

A second aspect of the present invention is a method for manufacturing a glass panel, in which a spacer is provided between a pair of glass plates each having a rectangular shape, to form a gap, and a peripheral portion of the pair of glass plates is filled with a melted metal material, so that the glass plates and the metal material are directly joined to each other and the gap is sealed in an airtight state, the method including: providing a first metal introduction device and a second metal introduction device which individually move along two sides intersecting each other of the glass plates and fill the peripheral portion of the pair of glass plates with the melted metal material; in order to fill the peripheral portion of both glass plates with the melted metal material, moving the first metal introduction device from one first corner at which two sides intersect each other of the glass plates, toward another end of a first side of the two sides, while performing filling with the metal material; before the metal material filling the first corner is solidified, moving the second metal introduction device from the first corner toward another end of another second side, while performing filling with the metal material; after the first side and the second side are filled with the metal material, rotating the pair of glass plates by 180 degrees so that the first corner and a second corner diagonal thereto of the pair of glass plates are switched with each other; and before the metal material filling the other end of the first side and the other end of the second side is solidified, the first metal introduction device is moved from another end of a third side of two sides intersecting each other at the second corner toward the second corner, while performing filling with the metal material, and also moving the second metal introduction device from another end of another fourth side toward the second corner, while performing filling with the metal material.

According to the second aspect of the present invention, regarding four sides composed of a first side, a second side, a third side, and a fourth side of a pair of rectangular glass plates, after the first side is filled with melted metal by the first metal introduction device and the second side is filled with the melted metal by the second metal introduction device, it is possible to fill the third side and the fourth side with melted metal merely by rotating both glass plates by 180 degrees, without changing the metal introduction directions and the movement paths of the first metal introduction device and the second metal introduction device.

In addition, before the metal material filling another end of the first side and another end of the second side is solidified, the first metal introduction device is moved from another end of the third side of two sides intersecting each other at the second corner toward the second corner, while performing filling with the metal material, and also, the second metal introduction device is moved from another end of another fourth side toward the second corner, while performing filling with the metal material. Thus, at the four corners, it is possible to perform melted metal filling work continuously by the first metal introduction device and the second metal introduction device without the need of particularly performing heating maintenance, and the entire peripheral portion of both glass plates can be sealed in a shorter time.

In addition, even if the size of the glass plates is changed, it is not necessary to change the metal introduction directions and the movement paths of the first metal introduction device and the second metal introduction device.

Therefore, it is possible to further decrease effort and time for sealing the peripheral portion of the glass plates.

In a third aspect of the present invention, a longer side of the two sides to be filled with the metal by the first metal introduction device and the second metal introduction device is preferentially filled with the metal.

According to the third aspect of the present invention, a longer side of the two sides to be filled with the metal by the first metal introduction device and the second metal introduction device is preferentially filled with the metal, whereby the time taken to perform filling with metal from one end to another end of one side by the first metal introduction device, and the time taken to perform filling with metal from one end to another end of one side by the second metal introduction device, are made close to each other. Thus, it is possible to finish sealing of the peripheral portion of the glass plates by metal in a shorter time as a whole.

A fourth aspect of the present invention is a method for manufacturing a glass panel, in which a spacer is provided between a pair of glass plates each having a rectangular shape, to form a gap, and a peripheral portion of the pair of glass plates is filled with a melted metal material, so that the glass plates and the metal material are directly joined to each other and the gap is sealed in an airtight state, the method including: providing, at a first corner of the glass plates, a first metal introduction device and a second metal introduction device which individually move along a first side and a second side intersecting each other at the first corner of the glass plates and fill the peripheral portion of the pair of glass plates with the melted metal material; providing, at a second corner of the glass plates diagonal to the first corner, a third metal introduction device and a fourth metal introduction device which individually move along a third side and fourth side intersecting each other at the second corner of the glass plates and fill the peripheral portion of the pair of glass plates with the melted metal material; in order to fill the peripheral portion of the pair of glass plates with the melted metal material, moving the first metal introduction device from the first corner toward another end of the first side, while performing filling with the metal material; before the metal material filling the first corner is solidified, moving the second metal introduction device from the first corner toward another end of the second side, while performing filling with the metal material; moving the third metal introduction device from the second corner toward another end of the third side, while performing filling with the metal material; and before the metal material filling the second corner is solidified, moving the fourth metal introduction device from the second corner toward another end of the fourth side, while performing filling with the metal material.

According to the fourth aspect of the present invention, it is possible to seal the glass plate peripheral portion by metal without changing the metal introduction directions and the movement paths of the first metal introduction device, the second metal introduction device, the third metal introduction device, and the fourth metal introduction device.

Further, at the four corners of the glass plates, it is possible to perform melted metal filling work continuously by the first metal introduction device, the second metal introduction device, the third metal introduction device, and the fourth metal introduction device without the need of particularly performing heating maintenance, and the entire peripheral portion of both glass plates can be sealed in a shorter time.

In a fifth aspect of the present invention, a longer side of the two sides to be filled with the metal by the first metal introduction device and the second metal introduction device, and a longer side of the two sides to be filled with the metal by the third metal introduction device and the fourth metal introduction device, are preferentially filled with the metal.

According to the fifth aspect of the present invention, not only a timing of metal filling from one end to another end of one side by the first metal introduction device and a timing of metal filling from one end to another end of one side by the second metal introduction device become close to each other, but also a timing of metal filling from one end to another end of one side by the third metal introduction device and a timing of metal filling from one end to another end of one side by the fourth metal introduction device become close to each other. Thus, it is possible to finish sealing of the peripheral portion of the glass plates by metal in a shorter time as a whole.

A sixth aspect of the present invention is a method for manufacturing a glass panel, in which a spacer is provided between a pair of glass plates each having a rectangular shape, to form a gap, and a peripheral portion of the pair of glass plates is filled with a melted metal material, so that the glass plates and the metal material are directly joined to each other and the gap is sealed in an airtight state, the method including: providing, at a first corner of the glass plates, a first metal introduction device and a second metal introduction device which individually move along a first side and a second side intersecting each other at the first corner of the glass plates and fill the peripheral portion of the pair of glass plates with the melted metal material; providing, at a location that is on an extension line of the first corner and a second corner of the glass plates diagonal to the first corner and that is farther from the first corner than the second corner, a third metal introduction device and a fourth metal introduction device which individually move along a third side and a fourth side intersecting each other at the second corner and fill the peripheral portion of the pair of glass plates with the melted metal material; in order to fill the peripheral portion of the pair of glass plates with the melted metal material, moving the first metal introduction device from the first corner toward another end of the first side, while performing filling with the metal material; before the metal material filling the first corner is solidified, moving the second metal introduction device from the first corner toward another end of the second side, while performing filling with the metal material; moving the pair of glass plates in parallel on the extension line of the first corner and the second corner; moving the third metal introduction device from the second corner toward another end of the third side, while performing filling with the metal material; and before the metal material filling the second corner is solidified, moving the fourth metal introduction device from the second corner toward another end of the fourth side, while performing filling with the metal material.

According to the sixth aspect of the present invention, it is possible to easily seal the glass plate peripheral portion by metal even for glass panels having different sizes, merely by moving both glass plates, without changing the metal introduction directions and the movement paths of the first metal introduction device, the second metal introduction device, the third metal introduction device, and the fourth metal introduction device.

A glass panel according to a seventh aspect of the present invention is a glass panel including: a pair of glass plates each having a rectangular shape; a gap formed by providing a spacer between the pair of glass plates; and a periphery sealing metal material filling a peripheral portion of the pair of glass plates so as to join the glass plates and seal the gap in an airtight state, wherein, in a filling portion where the periphery sealing metal material fills the peripheral portion of the pair of glass plates, at corners of short sides of four peripheral sides of the glass panel, metal streaks along a longitudinal direction of the short sides are formed in at least two or more locations of a plurality of the corners.

According to the seventh aspect of the present invention, longer sides of the four sides of the glass panel are sealed in preference to shorter sides. Thus, at the corners of short sides of the four peripheral sides of the glass panel, metal streaks along the longitudinal direction of the short sides are formed in at least two or more locations of a plurality of the corners, and airtight sealing work for the peripheral portion of the glass panel can be performed in a short time, whereby the production efficiency is improved.

BRIEF DESCRIPTION OF THE DRAWINGS

FIG. 10 illustrates operation in the fourth embodiment.

DESCRIPTION OF EMBODIMENTS

Hereinafter, embodiments of the present invention will be described with reference to the drawings.

Figure 1:
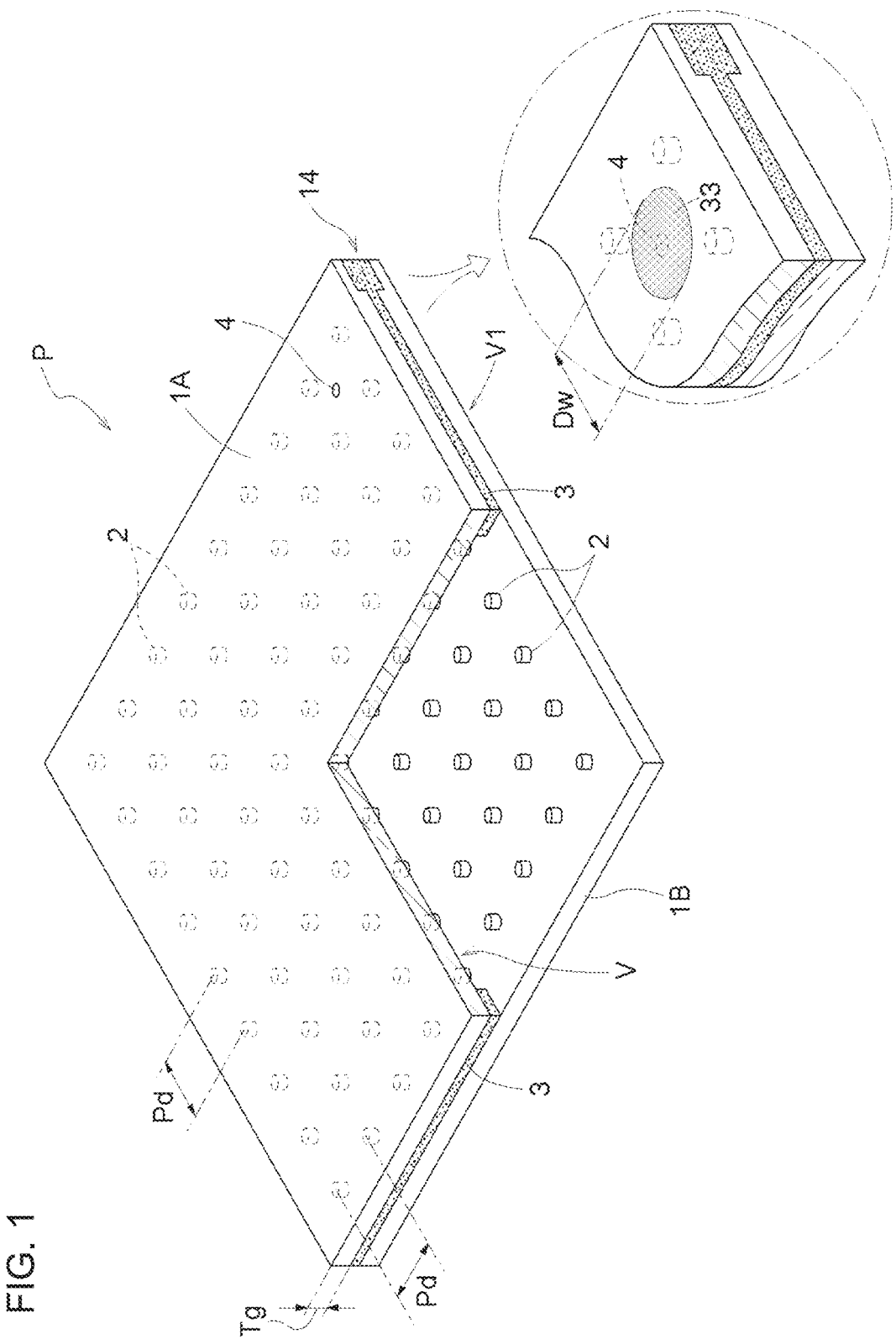
FIG. 1 is a partially cutaway perspective view of a glass panel.
Figure 2:
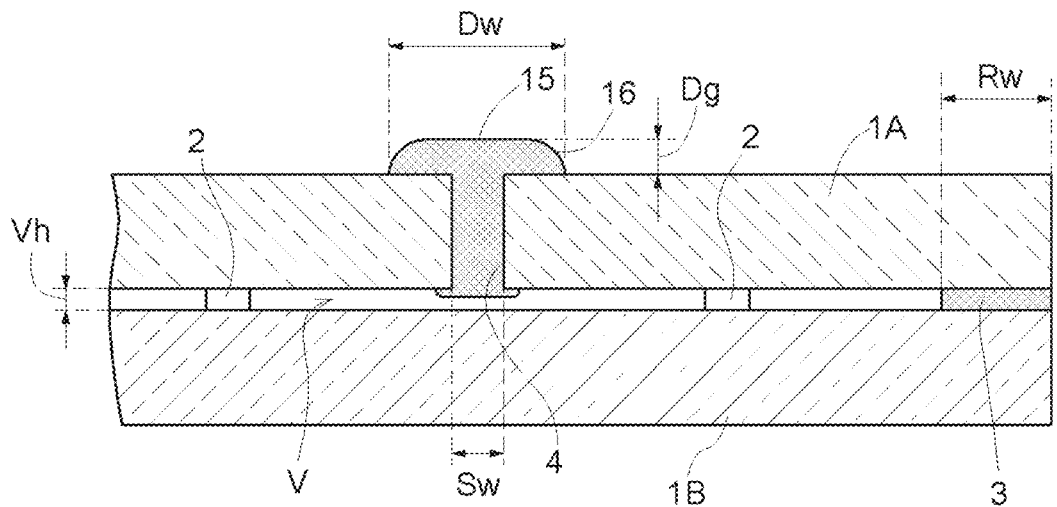
FIG. 2 is a vertical sectional view around a suction hole of the glass panel.

In FIG. 1, a glass panel P includes a pair of glass plates 1A, 1B opposed to each other, a gap V formed by a plurality of columnar spacers 2 being provided at a constant spacer pitch Pd in a matrix form between the pair of glass plates 1A, 1B, a periphery sealing metal material 3 sealing a peripheral portion V1 of the gap V, and a suction hole 4 penetrating one glass plate 1A of the pair of glass plates 1A, 1B. The suction hole 4 is sealed by a suction hole sealing metal material 15 covering the suction hole 4 including a surrounding area thereof.

In the glass panel P, the two glass plates 1A, 1B are transparent float glass, and the gap V is depressurized to 1.33 Pa ($1.0 \times 10^{-2}$ Torr) or lower. Here, the gap V is depressurized by discharging the inside air through the suction hole 4, and is sealed by the periphery sealing metal material 3 and the suction hole sealing metal material 15 in order to maintain the depressurized state of the gap V.

Each spacer 2 has a columnar shape, and has a diameter of approximately 0.3 to 1.0 mm and a height of approximately 30 μm to 1.0 mm. The spacer 2 is made from a material that does not buckle even when being subjected to compressive stress due to the atmospheric pressure applied to the glass plates 1A, 1B, e.g., a material having a compressive strength of $4.9 \times 10^8$ Pa ($5 \times 10^3$ kgf/cm$^2$) or greater, and preferably, stainless steel (SUS304) or the like.

Figure 3:
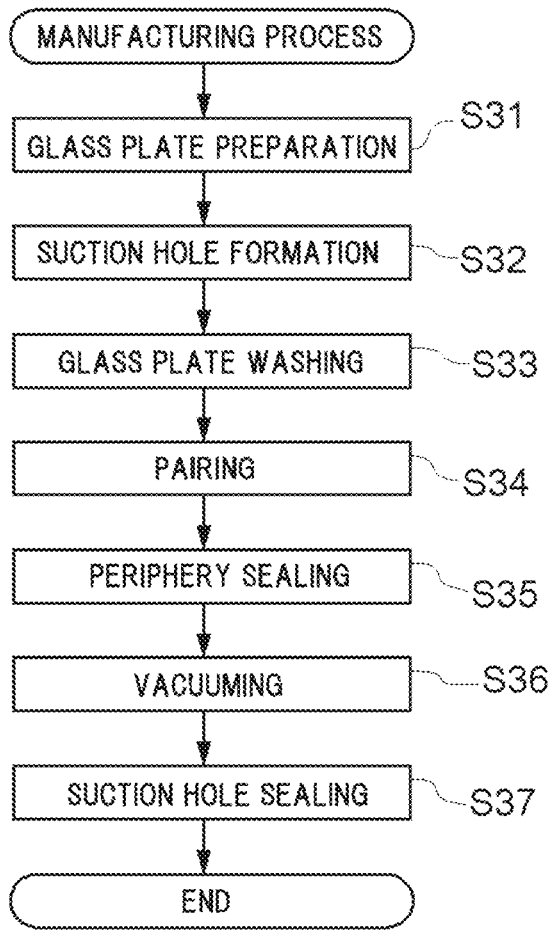
FIG. 3 is a flowchart showing a method for manufacturing the glass panel.

FIG. 3 is a flowchart showing a method for manufacturing the glass panel P shown in FIG. 1.

First, two glass raw plates (not shown) made from float glass and having a predetermined thickness are each cut in predetermined dimensions, e.g., 1200 mm×900 mm, to prepare the glass plates 1A, 1B having the same shape and the same size (step S31), and the glass plate 1A is perforated in the vicinity of one of the four corners thereof by a drill or the like, to form the suction hole 4 (step S32) (perforation step).

Next, in a space such as a clean room or a chemical clean room in which the contamination state of air can be chemically or physically controlled, the pair of glass plates 1A, 1B are cleaned using at least one of pure water brush cleaning, a liquid cleaning method, and optical cleaning (step S33) (cleaning step). In this liquid cleaning method, purity, deionized water, or the like is used. In addition, a cleaning liquid contains an alkaline detergent or ozone water, for example. In addition, the cleaning liquid may contain a polishing agent. As the polishing agent, for example, fine particles containing cerium oxide as a main component are used.

On the glass plate 1B which has no suction hole 4 and has been cleaned, a plurality of spacers 2 are arranged at a constant spacer pitch Pd in a matrix form, and the cleaned glass plate 1A is overlaid thereon, whereby the glass plates 1A, 1B are paired (step S34).

Further, while the paired glass plates 1A, 1B are kept substantially horizontal, the peripheral portion V1 of the pair of glass plates 1A, 1B is sealed using the periphery sealing metal material 3 having a melting temperature of 250° C. or lower (step S35) (periphery sealing).

Figure 4:
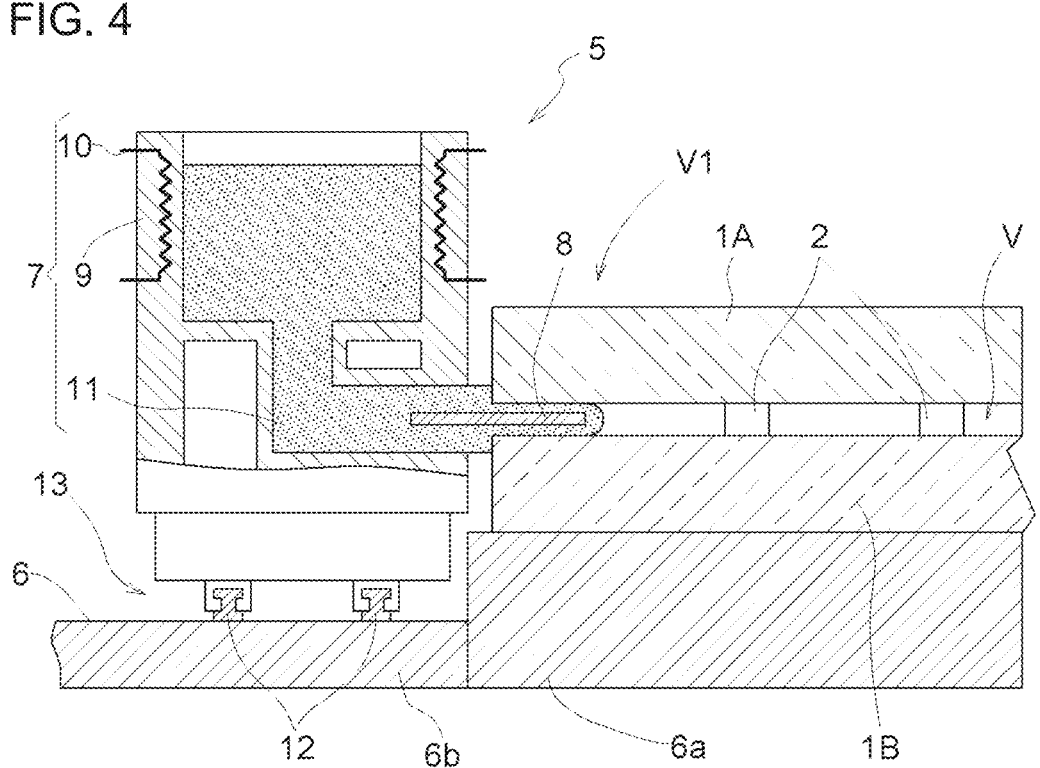
FIG. 4 is a major part vertical sectional view showing a sealing step.

FIG. 4 is a view used for explaining the periphery sealing in step S35 in FIG. 3.

In FIG. 4, a metal introduction device 5 has a surface plate 6 having a high portion 6a and a low portion 6b lower than the high portion 6a so as to be formed in a step shape. The pair of glass plates 1A, 1B are retained on the high portion 6a, and a supply tower 7 for supplying solder to the pair of glass plates 1A, 1B is retained on the low portion 6b. On the low portion 6b of the stepped surface plate 6, two rail members 12 are arranged along the pair of glass plates 1A, 1B, and the supply tower 7 is placed on a movement mechanism 13 which moves on the rail members 12.

The supply tower 7 includes a crucible portion 9 which stores solder in liquid phase or solid phase and has a rectangular cross-section, an electric heater 10 which is provided inside a side wall portion of the crucible portion 9 and heats solder stored in the crucible portion 9, an introduction path 11 which has an elongated sectional shape and which communicates with a bottom portion of the crucible portion 9 and opens toward an outer side of the peripheral portion V1 of the pair of glass plates 1A, 1B, and an introduction plate 8 provided horizontally at a middle level in the introduction path 11. The introduction plate 8 extends from the introduction path 11, to be inserted into the peripheral portion V1 of the pair of glass plates 1A, 1B. Thus, solder moves into the gap V with the aid of the surface tension thereof. In addition, the weight of solder at a liquid level ΔH in the crucible portion 9 is applied to solder at the introduction plate 8 part, thereby promoting the solder to move into the peripheral portion V1 of the pair of glass plates 1A, 1B.

Figure 5:
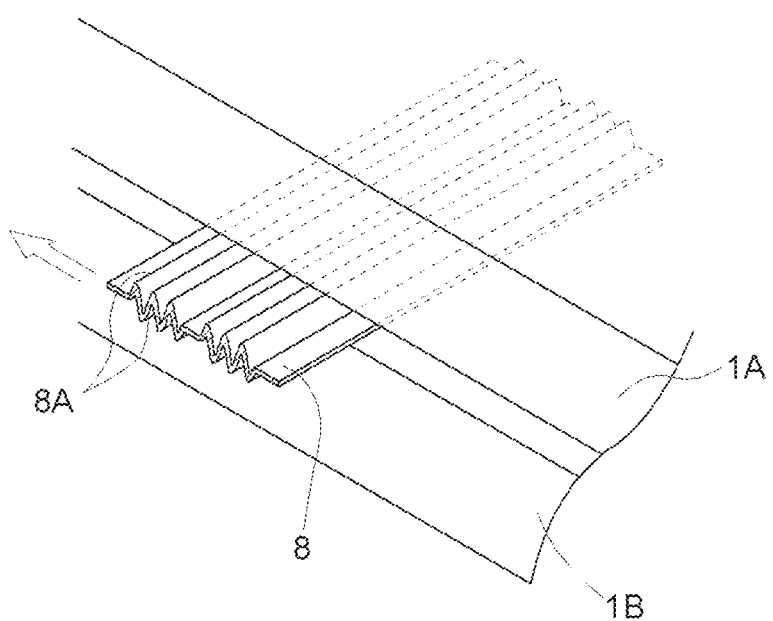
FIG. 5 illustrates an action of an introduction plate.

In addition, as shown in FIG. 5, the introduction plate 8 may have such a shape that bent portions 8A each waved up and down a plurality of times along the movement direction thereof are formed at two locations with a space therebetween (bellows shape).

That is, when the introduction plate 8 having the bent portions 8A moves, the bent portions 8A having a spring effect slightly rubs the surface of the glass plates, so that adhesion of solder to the glass surfaces is enhanced, thus providing an effect of reliably ensuring airtightness of the gap V.

In addition, the introduction plate 8 may have a bow shape providing a spring effect, or may have a planar shape having no bent portions. However, for the above reason, the introduction plate 8 having the bent portions 8A is more advantageous.

Meanwhile, the movement mechanism 13 moves at a constant speed on the rail members 12 along the peripheral portion V1 of the pair of glass plates 1A, 1B. Therefore, with the introduction plate 8 inserted into the gap V from an opened end part 14 of the pair of glass plates 1A, 1B, the periphery sealing metal material 3 moves into the entire area of the peripheral portion V1 of the pair of glass plates 1A, 1B via the introduction plate 8. Thus, the peripheral portion V1 of the gap V formed between the pair of glass plates 1A, 1B is sealed in an airtight state by the periphery sealing metal material 3.

Figure 6:
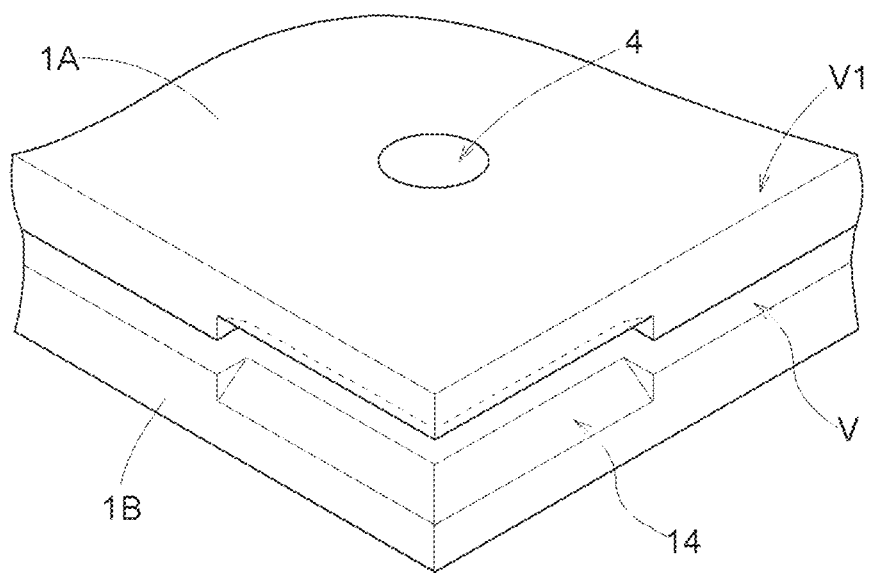
FIG. 6 is an enlarged view around the suction hole before sealing of the suction hole.

As shown in FIG. 6, the opened end part 14 is provided at a corner of the glass panel P, and is formed by chamfering gap-V-side corner portions of the pair of glass plates 1A, 1B so as to facilitate insertion of the introduction plate 8 into the gap V.

In subsequent step S36, in the vicinity of the suction hole 4, an exhaust cup is attached to the atmospheric-side main surface of the glass plate 1A so as to cover the suction hole 4, and vacuuming is performed in which gas molecules in the gap V are discharged to outside so as to reduce the pressure of the gap V to 1.33 Pa or lower through suction by a rotary pump or a turbomolecular pump (not shown) connected to the exhaust cup (step S36).

It is noted that the pump used in this step is not limited to the above-described rotary pump or turbomolecular pump, but may be any pump that can be connected to the exhaust cup and can perform suction.

Next, the suction hole sealing metal material 15 is dropped so as to overlay the suction hole 4, whereby the glass surface in the vicinity of the suction hole 4 and the suction hole sealing metal material 15 are adhered to each other to make sealing (step S37).

Thus, the gap V formed between the pair of glass plates 1A, 1B is sealed up.

It is noted that, among the above steps, the steps from cleaning of the main surfaces of the pair of glass plates 1A, 1B (step S33) to sealing by adhering the glass surface in the vicinity of the suction hole 4 and the suction hole sealing metal material 15 (step S37) are each performed in a space in which the contamination state of the air can be chemically or physically controlled.

In the present embodiment, the pair of glass plates 1A, 1B are cleaned using the liquid cleaning method. However, without limitation thereto, the pair of glass plates 1A, 1B may be cleaned using at least one of a pure water brush cleaning method, an ultrasonic cleaning method, an alkaline water cleaning method, a heating cleaning method, a vacuum (frozen) cleaning method, a UV cleaning method, an ozone cleaning method, and a plasma cleaning method. Thus, occurrence of gas molecules that can be decomposed or scattered from the main surfaces of the pair of glass plates 1A, 1B can be suppressed, and therefore the initial performance of the glass panel P can be exhibited over a long period.

In the present embodiment, as the periphery sealing metal material 3, solder having a melting temperature of 250° C. or lower, e.g., solder obtained by adding Ti to solder having a composition of 91.2Sn—8.8Zn (eutectic temperature: 198° C.) is used to seal the peripheral portion V1 of the pair of glass plates 1A, 1B. However, the periphery sealing metal material 3 (solder) is not limited thereto. The peripheral portion V1 of the pair of glass plates 1A, 1B may be sealed using a sealing material that has a melting temperature of 250° C. or lower and that is a metal material including at least one material selected from a group consisting of Sn, Cu, In, Bi, Zn, Pb, Sb, Ga, and Ag.

In addition, the periphery sealing metal material 3 may include, instead of Ti or in addition to Ti, at least one material selected from a group consisting of Al, Cr, and Si. This can improve adhesion between the periphery sealing metal material 3 and the glass component of the pair of glass plates 1A, 1B.

In the present embodiment, as the suction hole sealing metal material 15, solder having a melting temperature of 250° C. or lower, e.g., solder obtained by adding Ti to solder having a composition of 91.2Sn—8.8Zn (eutectic temperature: 198° C.) is used to seal the suction hole 4. However, the suction hole sealing metal material 15 (solder) is not limited thereto. The suction hole 4 may be sealed using a sealing material that has a melting temperature of 250° C. or lower and that is a metal material including at least one material selected from a group consisting of Sn, Cu, In, Bi, Zn, Pb, Sb, Ga, and Ag.

It is noted that, in the case of selecting Sn, it suffices that the amount thereof is 90% or higher, and in the case of Sn with Cu added thereto, the amount of Cu needs to be 0.1% or lower.

In addition, the suction hole sealing metal material 15 may include, instead of Ti or in addition to Ti, at least one material selected from a group consisting of Al, Cr, and Si.

Further, as the suction hole sealing metal material 15, solder having a component different from the periphery sealing metal material 3 may be used.

It is noted that containing Ti (titanium) in the suction hole sealing metal material 15 or the periphery sealing metal material 3 improves close adhesion to glass.

In the present embodiment, the pressure of the gap V is reduced to 1.33 Pa or lower. However, without limitation thereto, the pressure of the gap V may be reduced to reach almost a vacuum. This can further enhance thermal insulation performance of the glass panel P.

In the present embodiment, the lower limit of a thickness Tg of each of the pair of glass plates is 0.3 mm or greater. In addition, the lower limit is preferably 0.5 mm or greater. Further preferably, the lower limit is 1 mm or greater. If the thickness Tg of each of the pair of glass plates is small, the heat storage capacity of the glass itself becomes small. Therefore, at the time of periphery sealing, the amount of heat dissipation to the air per unit time increases, so that the periphery sealing metal material 3 is more readily cooled. Thus, solidification of the melted periphery sealing metal material 3 can be promoted. However, if the glass plate is thinned, rigidity of the glass plate reduces, and thus the amount of deformation of the glass plate due to the same magnitude of external force increases. Therefore, in the glass panel P, tensile stress occurring in the vicinity of a gap-side surface of the suction hole 4 increases.

The upper limit of the thickness Tg of each of the pair of glass plates is 15 mm or less. Preferably, the upper limit is 12 mm or less. Further preferably, the upper limit is 10 mm or less. In the case of using a thick glass plate, rigidity of the glass plate increases, and thus the amount of deformation of the glass plate due to the same magnitude of external force decreases. Therefore, in the glass panel P, tensile stress occurring in the vicinity of a gap-side surface of the suction hole 4 reduces, and thus long-term durability is improved. On the other hand, if the glass plate thickness Tg increases, the amount of the suction hole sealing metal material 15 flowing into the suction hole 4 at the time of sealing the suction hole is decreased. Thus, protrusion of the suction hole sealing metal material 15 on the gap side is reduced, so that it becomes difficult to relax tensile stress occurring in the vicinity of the gap-side surface of the suction hole 4.

The pair of glass plates 1A, 1B are float glass, but are not limited thereto. In accordance with the intended usage as described above, various types of glass such as figured glass, frosted glass having a light diffusing function due to surface treatment, wire mesh glass, a wire glass plate, tempered glass, double-tempered glass, low-reflection glass, high-transmission glass plate, a ceramic glass plate, special glass having a function of absorbing heat rays or ultraviolet rays, or a combination thereof, can be appropriately selected and used as the pair of glass plates 1A, 1B.

Further, also regarding the composition of the pair of glass plates 1A, 1B, soda silicate glass, soda-lime glass, borosilicate glass, aluminosilicate glass, various crystallized glasses, or the like can be used.

In the present embodiment, the opened end part 14 is formed by chamfering gap-V-side corner portions of the glass plates 1A, 1B in a planar shape. However, without limitation thereto, any shape that allows the introduction plate 8 to be easily inserted, e.g., curved-surface chamfers, can be appropriately selected and provided to the glass plates 1A, 1B.

In the present embodiment, the spacer pitch Pd is 5 to 100 mm, preferably 5 to 80 mm, and further preferably 5 to 60 mm.

In addition, the spacer 2 is formed from stainless steel, but is not limited thereto. The spacer 2 may be formed from a high-rigidity material, e.g., Inconel, metal such as iron, aluminum, tungsten, nickel, chromium, or titanium, an alloy such as carbon steel, chrome steel, nickel steel, nickel chrome steel, manganese steel, chrome manganese steel, chrome molybdenum steel, silicon steel, brass, solder, or duralumin, ceramic, glass, etc. In addition, the shape of the spacer 2 is not limited to a columnar shape, but may be various shapes such as an angled shape or a spherical shape.

In the present embodiment, a gap height Vh is 30 μm to 1 mm. It is noted that the gap height Vh is substantially the same as the height of the spacer 2.

It is noted that, in the gap V, an evaporable getter may be used for adsorbing gas molecules in the gap V, a non-evaporable getter which adsorbs and removes gas molecules by being heated and activated may be used, or a non-evaporable getter and an evaporable getter may be used in combination. In addition, in the gap V, getter materials (adsorbents) and adsorbent storage holes may be provided at two or more locations.

In the present embodiment, the periphery sealing metal material 3 is formed using the metal introduction device 5, but another method may be used. The periphery sealing metal material 3 may be formed using at least one joining method of anodic bonding, ultrasonic welding, multistage welding, laser welding, and pressure bonding. Thus, adhesion of the periphery sealing metal material 3 to the pair of glass plates 1A, 1B can be improved.

In addition, a width Rw of the periphery sealing metal material 3 as seen in the thickness direction with respect to the plane of the glass panel P is not less than 1 mm and not greater than 10 mm. If the width Rw is less than 1 mm, it is difficult to keep the sealing of the gap V of the glass panel P. In addition, if the width Rw is greater than 10 mm, the amount of heat exchange occurring through the periphery metal sealing material 3 becomes excessive. Further preferably, the width Rw is not less than 1 mm and not greater than 5 mm. In this case, it is possible to keep the sealing of the gap V of the glass panel P and in addition, reduce the amount of heat exchange.

In the present embodiment, a part of the suction hole sealing metal material 15 that protrudes from the front-side surface of the glass plate 1A after sealing is referred to as a protruding portion 16. A protruding portion diameter Dw (which is the same as the width of a contact portion 33 in contact with the glass plate 1A in FIG. 1) of the protruding portion 16 is 2 to 30 mm. Further preferably, the protruding portion diameter Dw is 2 to 15 mm. It is noted that, in any case, the protruding portion diameter Dw is greater than a suction hole diameter Sw described later.

In addition, a protruding portion thickness Dg of the protruding portion 16 is 0.1 to 20 mm. Preferably, the protruding portion thickness Dg is 0.1 to 10 mm.

In the present embodiment, the suction hole diameter Sw is 2 to 10 mm. Preferably, the suction hole diameter Sw is 2 to 5 mm. In the case of tempered glass, it is desirable that the suction hole diameter Sw is greater than the glass thickness and is not greater than 10 mm. This is for passing air through the suction hole 4 at the time of air-quenching tempering.

In addition, at least a lower edge portion of the suction hole 4 may be formed in a curved-surface shape or may be chamfered (a minute surface may be provided at the edge portion).

Next, a metal filling method for the peripheral portion V1 of the glass plates by the metal introduction device 5 will be described.

First Embodiment

Figure 7A:
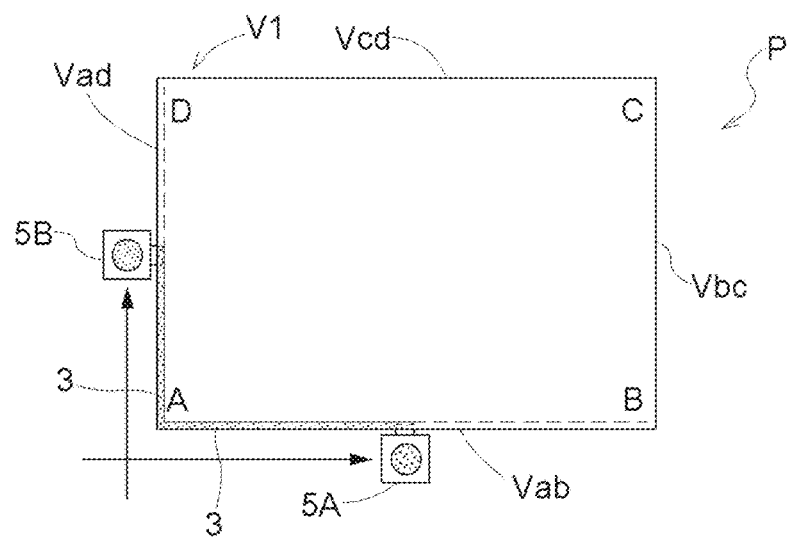
FIG. 7A illustrates operation in the first embodiment.
Figure 7B:
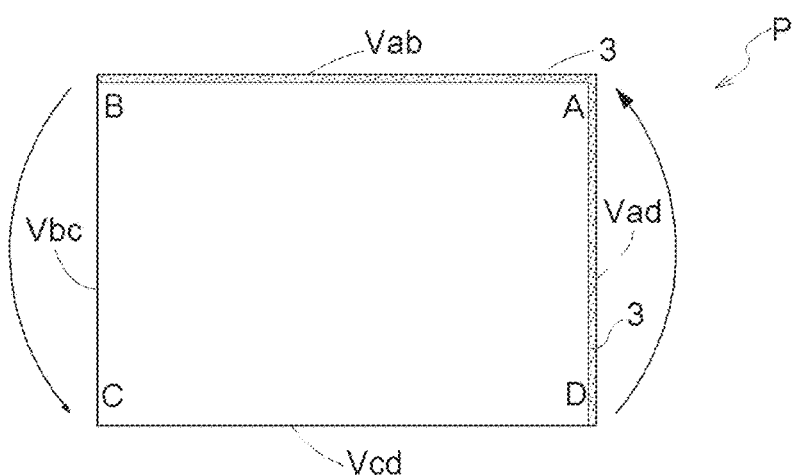
FIG. 7B illustrates operation in the first embodiment.
Figure 7C:
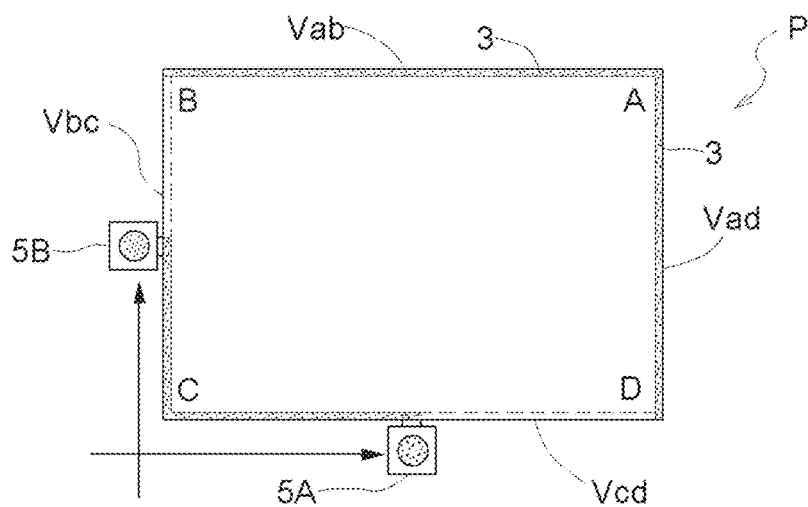
FIG. 7C illustrates operation in the first embodiment.

As shown in FIGS. 7A to 7C, in a method for manufacturing a glass panel, in which the spacers 2 are provided between the pair of glass plates 1A, 1B each having a rectangular shape, to form the gap V, and the peripheral portion V1 of both glass plates 1A, 1B is filled with a melted metal material, so that the glass plates 1A, 1B and the metal material are directly joined to each other and the gap V is sealed in an airtight state, the corners of the glass plates 1A, 1B are respectively defined as first corner A, third corner B, second corner C, and fourth corner D, and the sides extending between the corners are respectively defined as first side Vab, second side Vad, third side Vbc, and fourth side Vcd. In this case, a first metal introduction device 5A and a second metal introduction device 5B which individually move along two sides intersecting each other of the glass plates 1A, 1B and fill the peripheral portion V1 of both glass plates 1A, 1B with a melted metal material (periphery sealing metal material 3), are provided. Next, in order to fill the peripheral portion V1 of both glass plates 1A, 1B with the melted metal material, the first metal introduction device 5A is moved from one first corner A at which two sides intersect each other of the glass plates 1A, 1B, toward another end of the first side Vab of the two sides, while performing filling with the metal material. In addition, before the metal material filling the first corner A is solidified, the introduction plate 8 of the second metal introduction device 5B is inserted into the first corner A, and the second metal introduction device 5B is moved from the first corner A toward another end of the other second side Vad while performing filling with the metal material. Then, after the first side Vab and the second side Vad are filled with the metal material (FIG. 7A), both glass plates 1A, 1B are rotated by 180 degrees so that the first corner A and the second corner C diagonal thereto of both glass plates 1A, 1B are switched with each other (FIG. 7B), and the first metal introduction device 5A is moved toward another end of the fourth side Vcd of two sides intersecting each other at the second corner C, while performing filling with the metal material. In addition, before the metal material filling the second corner C is solidified, the second metal introduction device 5B is moved from the second corner C toward another end of the other third side Vbc while performing filling with the metal material (FIG. 7C).

It is noted that the third corner B and the fourth corner D are heated so that the filling metal is not solidified.

Second Embodiment

Figure 8A:
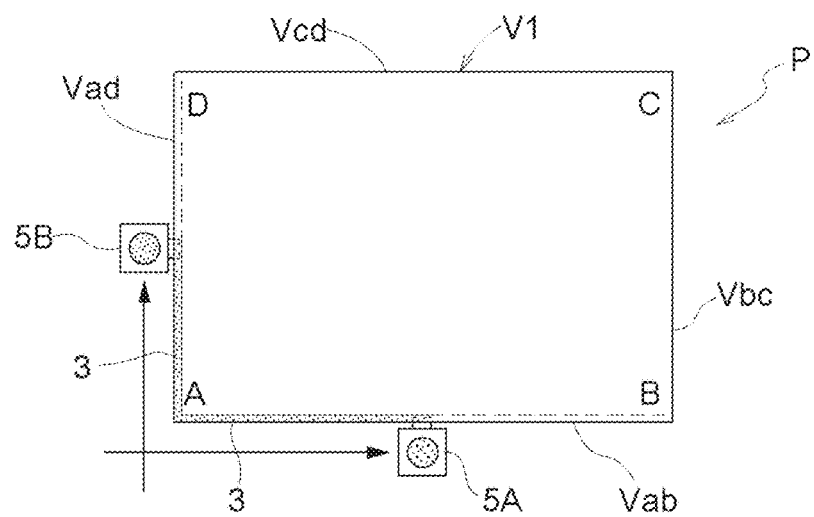
FIG. 8A illustrates operation in the second embodiment.
Figure 8B:
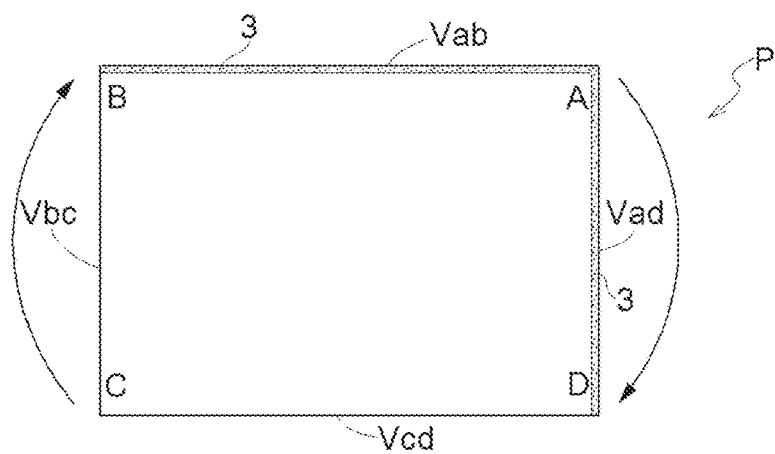
FIG. 8B illustrates operation in the second embodiment.
Figure 8C:
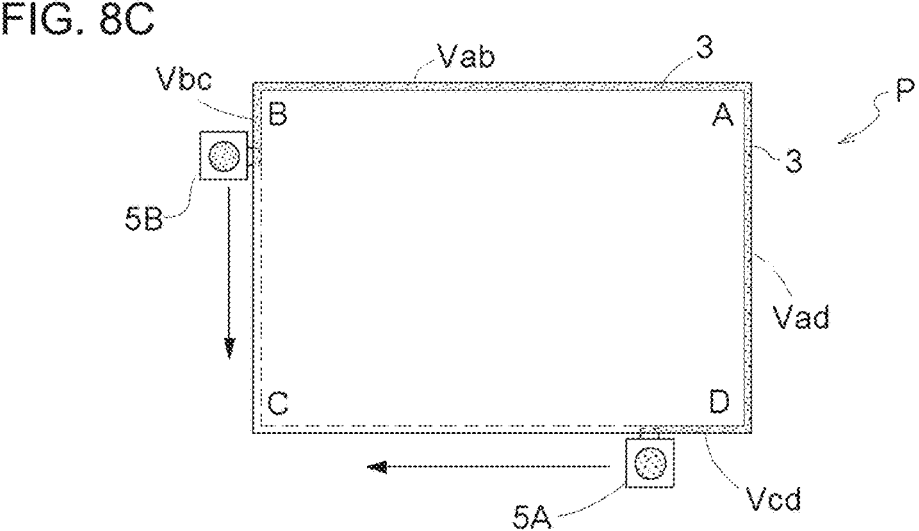
FIG. 8C illustrates operation in the second embodiment.

As shown in FIGS. 8A to 8C, in a method for manufacturing the glass panel P, in which the spacers 2 are provided between the pair of glass plates 1A, 1B each having a rectangular shape, to form the gap V, and the peripheral portion V1 of both glass plates 1A, 1B is filled with a melted metal material, so that the glass plates 1A, 1B and the metal material are directly joined to each other and the gap V is sealed in an airtight state, a first metal introduction device 5A and a second metal introduction device 5B which individually move along two sides intersecting each other of the glass plates 1A, 1B and fill the peripheral portion V1 of both glass plates 1A, 1B with a melted metal material, are provided. Next, in order to fill the peripheral portion V1 of both glass plates 1A, 1B with the melted metal material, the first metal introduction device 5A is moved from one first corner A at which two sides intersect each other of the glass plates 1A, 1B, toward another end of the first side Vab of the two sides, while performing filling with the metal material. In addition, before the metal material filling the first corner A is solidified, the second metal introduction device 5B is moved from the first corner A toward another end of the other second side Vad while performing filling with the metal material. Then, after the first side Vab and the second side Vad are filled with the metal material (FIG. 8A), both glass plates 1A, 1B are rotated by 180 degrees so that the first corner A and the second corner C diagonal thereto of both glass plates 1A, 1B are switched with each other (FIG. 8B). Then, before the metal material filling the other end of the first side Vab and the other end of the second side Vad is solidified, the first metal introduction device 5A is moved from another end of the fourth side Vcd of two sides intersecting each other at the second corner C, toward the second corner C, while performing filling with the metal material, and also, the second metal introduction device 5B is moved from another end of the other third side Vbc toward the second corner C while performing filling with the metal material (FIG. 8C).

Third Embodiment

Figure 9A:
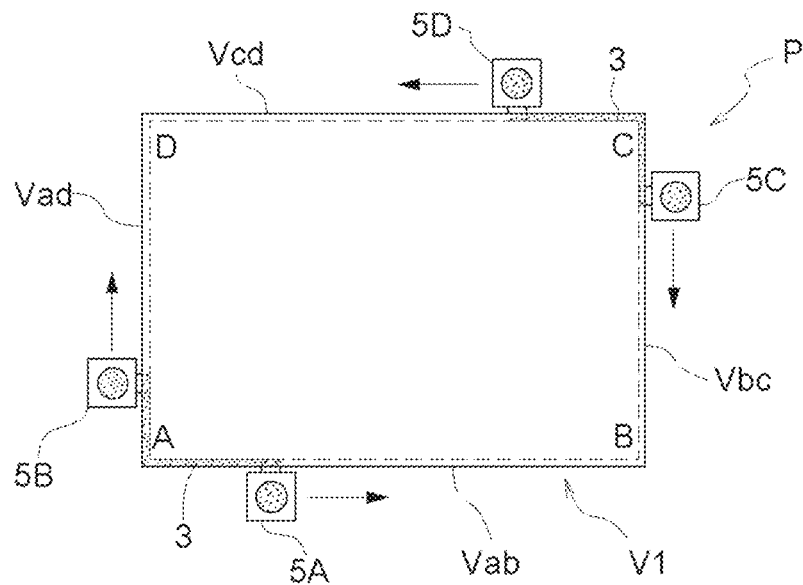
FIG. 9A illustrates operation in the third embodiment.
Figure 9B:
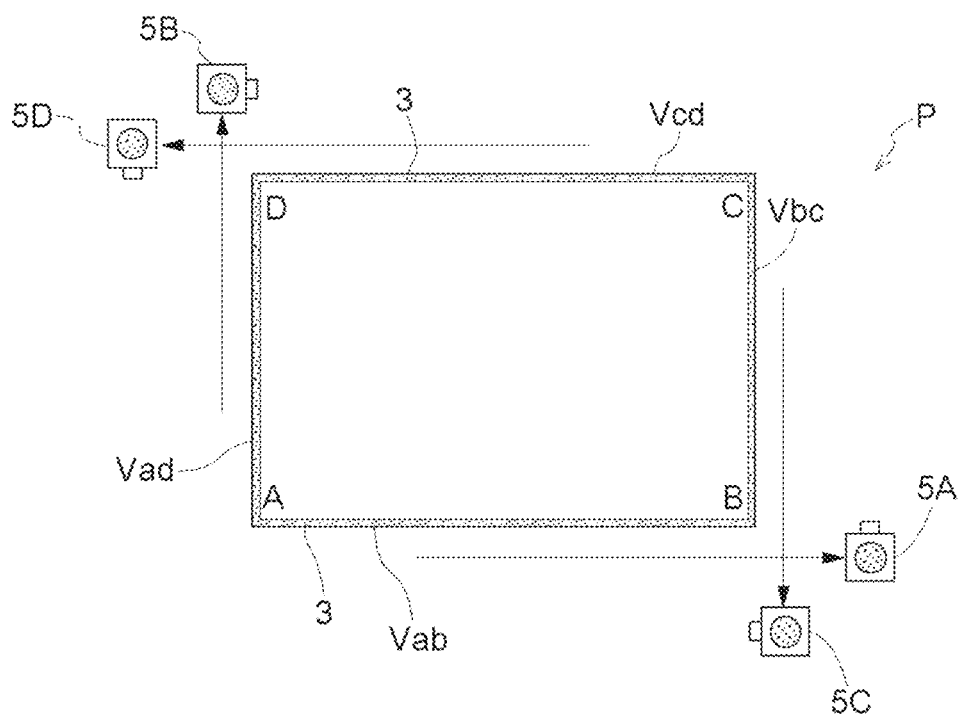
FIG. 9B illustrates operation in the third embodiment.

As shown in FIGS. 9A and 9B, in a method for manufacturing the glass panel P, in which the spacers 2 are provided between the pair of glass plates 1A, 1B each having a rectangular shape, to form the gap V, and the peripheral portion V1 of both glass plates 1A, 1B is filled with a melted metal material, so that the glass plates 1A, 1B and the metal material are directly joined to each other and the gap V is sealed in an airtight state, a first metal introduction device 5A and a second metal introduction device 5B which individually move along the first side Vab and the second side Vad intersecting each other at the first corner A of the glass plates and fill the peripheral portion V1 of both glass plates 1A, 1B with a melted metal material, are provided at the first corner A, and also, a third metal introduction device 5C and a fourth metal introduction device 5D which individually move along the third side Vbc and the fourth side Vcd intersecting each other at the second corner C of the glass plates diagonal to the first corner A and fill the peripheral portion V1 of both glass plates 1A, 1B with a melted metal material, are provided at the second corner C (FIG. 9A). Next, in order to fill the peripheral portion V1 of both glass plates 1A, 1B with the melted metal material, the first metal introduction device 5A is moved from one first corner A toward another end of the first side Vab while performing filling with the metal material. In addition, before the metal material filling the first corner A is solidified, the second metal introduction device 5B is moved from the first corner A toward another end of the second side Vad while performing filling with the metal material. At the same time, the third metal introduction device 5C is moved from the second corner C toward another end of the third side Vbc while performing filling with the metal material. Before the metal material filling the second corner C is solidified, the fourth metal introduction device 5D is moved from the second corner C toward another end of the fourth side Vcd while performing filling with the metal material (FIG. 9B).

It is noted that, in order that the first metal introduction device 5A and the third metal introduction device 5C finish filling with the metal material at the third corner B and the second metal introduction device 5B and the fourth metal introduction device 5D finish filling with the metal material at the fourth corner D before the metal material is solidified at the third corner B and the fourth corner D, it is desirable that, at least, filling with the metal material is preferentially started from longer sides of the four sides.

Fourth Embodiment

As shown in FIG. 10, in a method for manufacturing the glass panel, in which the spacers 2 are provided between the pair of glass plates 1A, 1B each having a rectangular shape, to form the gap V, and the peripheral portion V1 of both glass plates 1A, 1B is filled with a melted metal material, so that the glass plates 1A, 1B and the metal material are directly joined to each other and the gap V is sealed in an airtight state, a first metal introduction device 5A and a second metal introduction device 5B which individually move along the first side Vab and the second side Vad intersecting each other at the first corner A of the glass plates and fill the peripheral portion V1 of both glass plates 1A, 1B with a melted metal material, are provided at the first corner A, and also, a third metal introduction device 5C and a fourth metal introduction device 5D which individually move along the third side Vbc and the fourth side Vcd intersecting each other at the second corner C and fill the peripheral portion V1 of both glass plates 1A, 1B with a melted metal material, are provided at a location that is on an extension line of the first corner A and the second corner C of the glass plates diagonal to the first corner A, and that is farther from the first corner A than the second corner C. Next, in order to fill the peripheral portion V1 of both glass plates 1A, 1B with the melted metal material, both glass plates 1A, 1B are aligned at the position of a first alignment 22, and then the first metal introduction device 5A is moved from the first corner A toward another end of the first side Vab while performing filling with the metal material. In addition, before the metal material filling the first corner A is solidified, the second metal introduction device 5B is moved from the first corner A toward another end of the second side Vad while performing filling with the metal material, and both glass plates 1A, 1B are moved in parallel on the extension line of the first corner A and the second corner C by a conveyor 20. Then, both glass plates 1A, 1B are fixed at the position of a second alignment 23, and the third metal introduction device 5C is moved from the second corner C toward another end of the third side Vbc while performing filling with the metal material. In addition, before the metal material filling the second corner C is solidified, the fourth metal introduction device 5D is moved from the second corner C toward another end of the fourth side Vcd while performing filling with the metal material.

Figure 11:
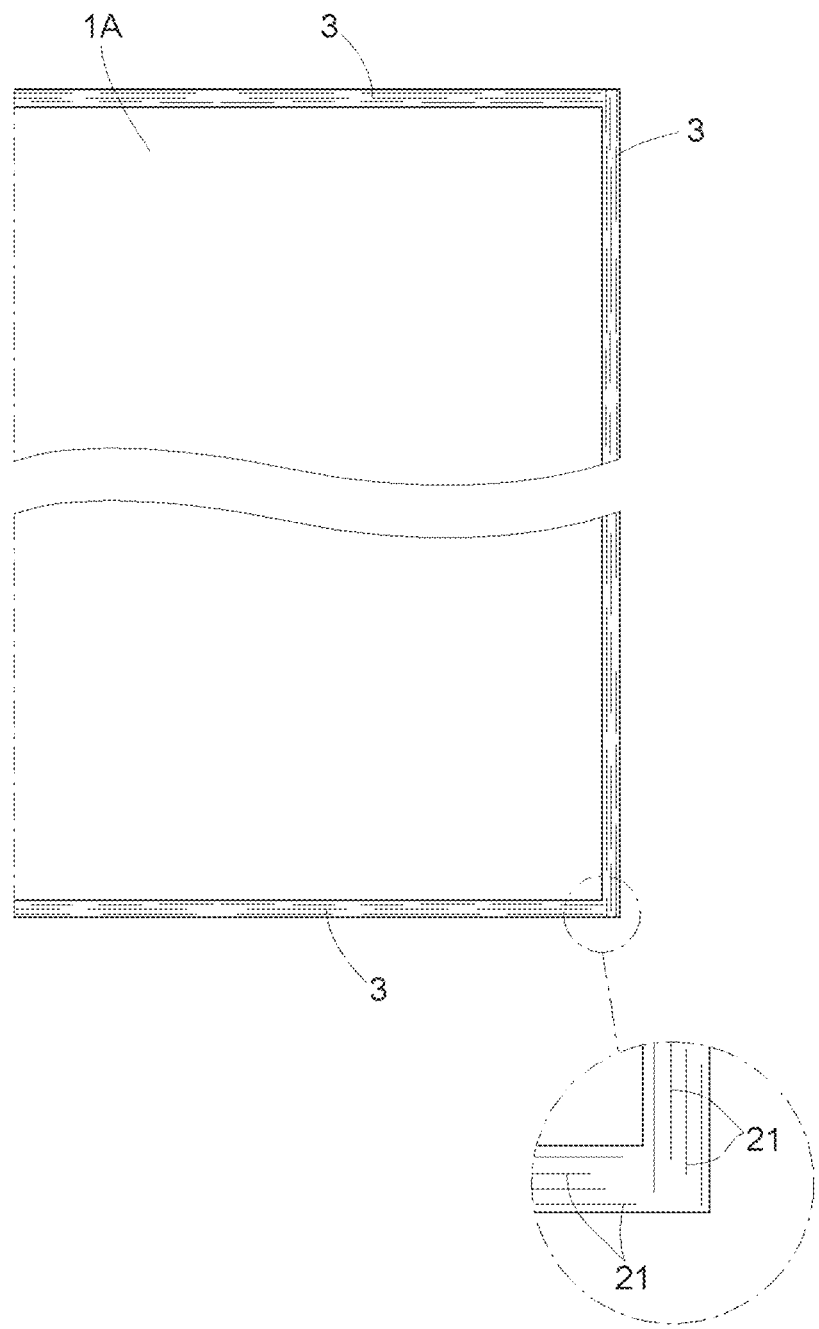
FIG. 11 is a partial plan view of the glass panel.

In the above embodiments 1 to 4, the glass panel P consequently includes the pair of glass plates 1A, 1B each having a rectangular shape, the gap V formed with the spacers 2 provided between the pair of glass plates 1A, 1B, and the periphery sealing metal material filling the peripheral portion V1 of the pair of glass plates 1A, 1B so as to join the glass plates 1A, 1B and seal the gap V in an airtight state. In the filling portion where the periphery sealing metal material 3 fills the peripheral portion V1 of both glass plates 1A, 1B, metal streaks 21 appear in the direction in which the introduction plate 8 passes, as shown in FIG. 11.

Figure 12A:
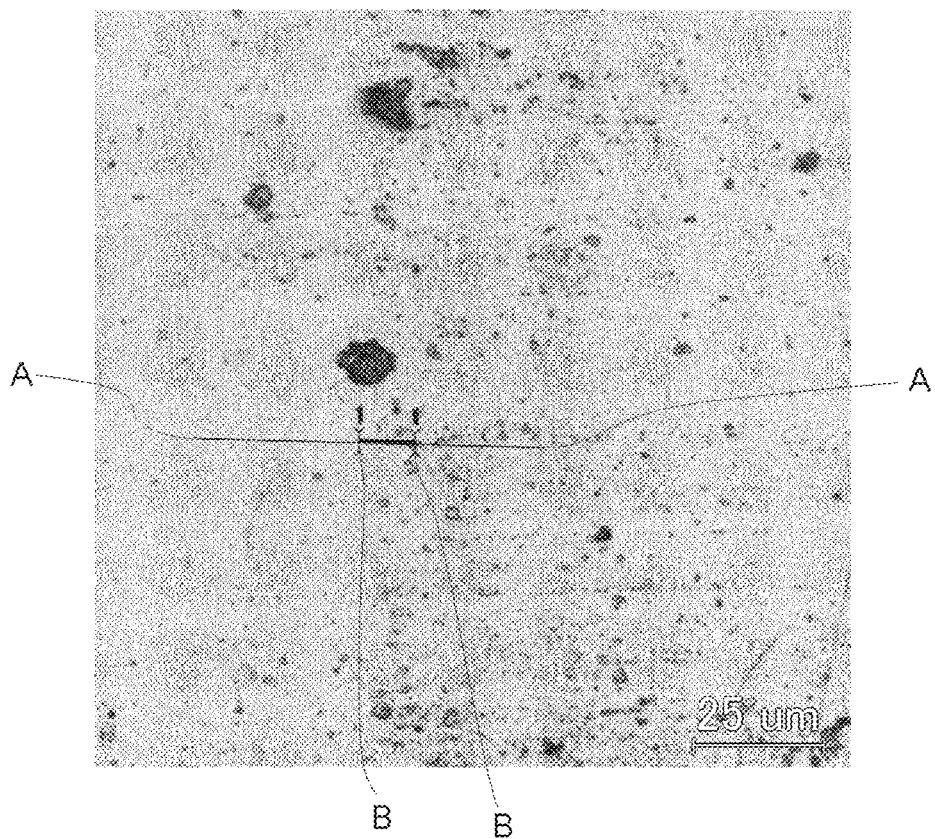
FIG. 12A is a micrograph of a part filled with the periphery sealing metal material.
Figure 12B:
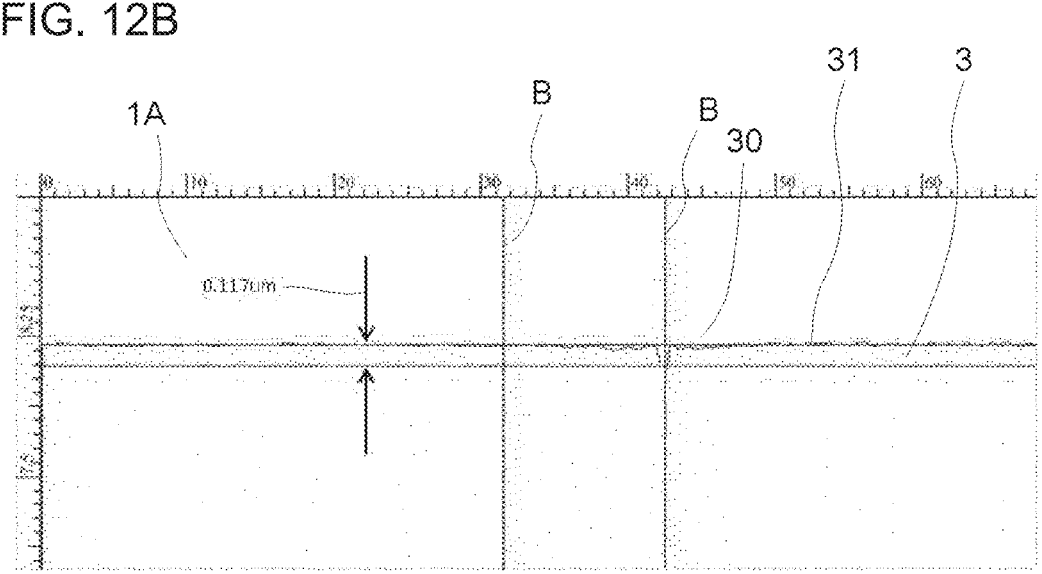
FIG. 12B is a measurement view showing the shape in the depth direction of line A-A in FIG. 12A.

When the metal streak 21 is viewed in an enlarged manner with a microscope as shown in FIG. 12A, the shape in the depth direction of line A-A in a laser microscope image shown in FIG. 12A appears as shown in FIG. 12B. As is clearly shown in the area of line B-B in FIG. 12B, the shape of a solder surface 31 has irregularity and it is considered that bubbles are formed between the solder surface 31 and an interface 30 of the glass plate 1A or 1B. Particularly in a deep bubble portion, a bubble having a size of 0.117 μm is observed. It is noted that the scales on the vertical and horizontal axes in FIG. 12B are μm. It is considered that, mainly, independent bubbles are present in a streak shape (in FIG. 12A, independent bubbles are present side by side in the horizontal direction so as to appear in a streak shape), but a metal oxide may be present in a streak shape.

In particular, as a precondition, in the case where the plurality of metal introduction devices have the same supply speed for the periphery sealing metal material 3 and the introduction plate 8 passes the long-side portion first in preference to the short-side portion among the four peripheral sides of the glass panel P, the production efficiency is improved.

Figure 13A:
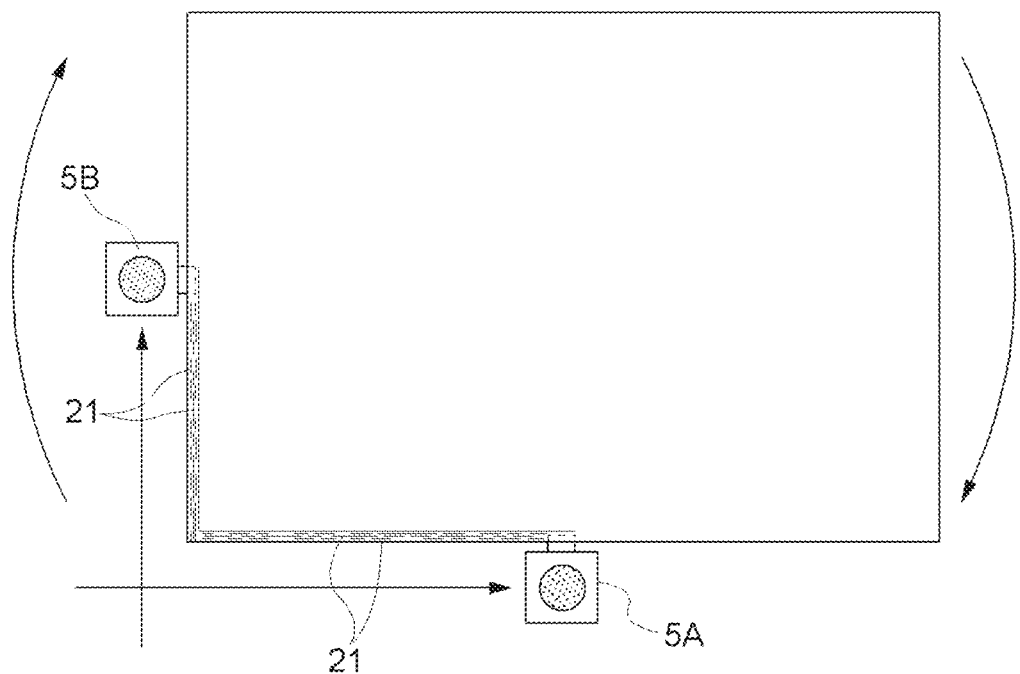
FIG. 13A illustrates operation in an initial-stage filling state of the periphery sealing metal material in the first embodiment.
Figure 13B:
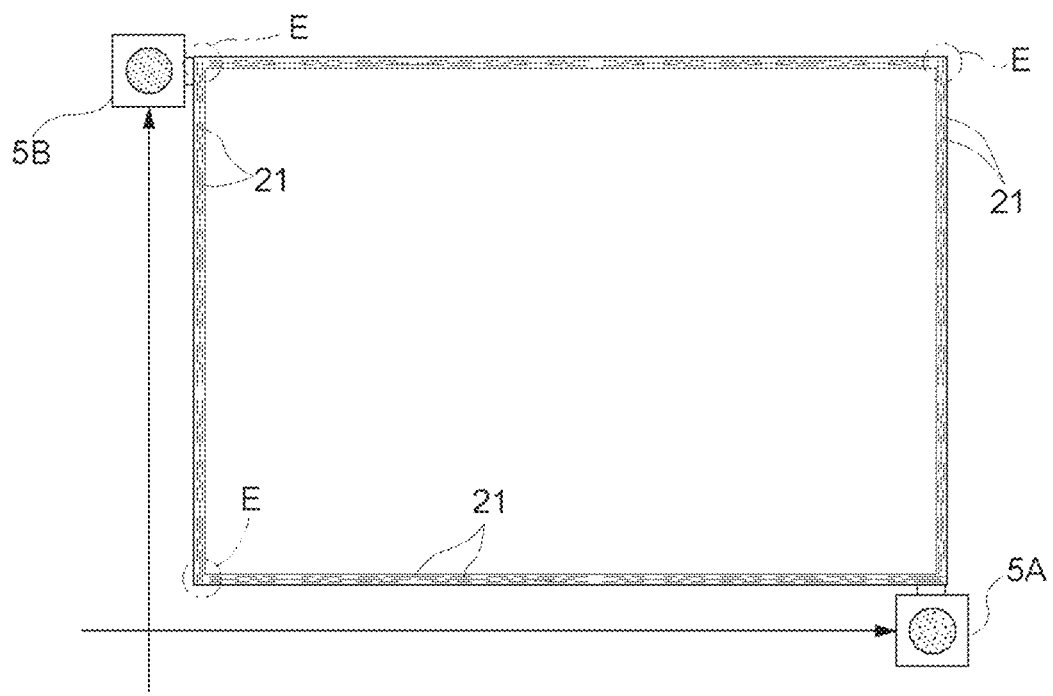
FIG. 13B illustrates operation in a later-stage filling state of the periphery sealing metal material in the first embodiment.
Figure 14A:
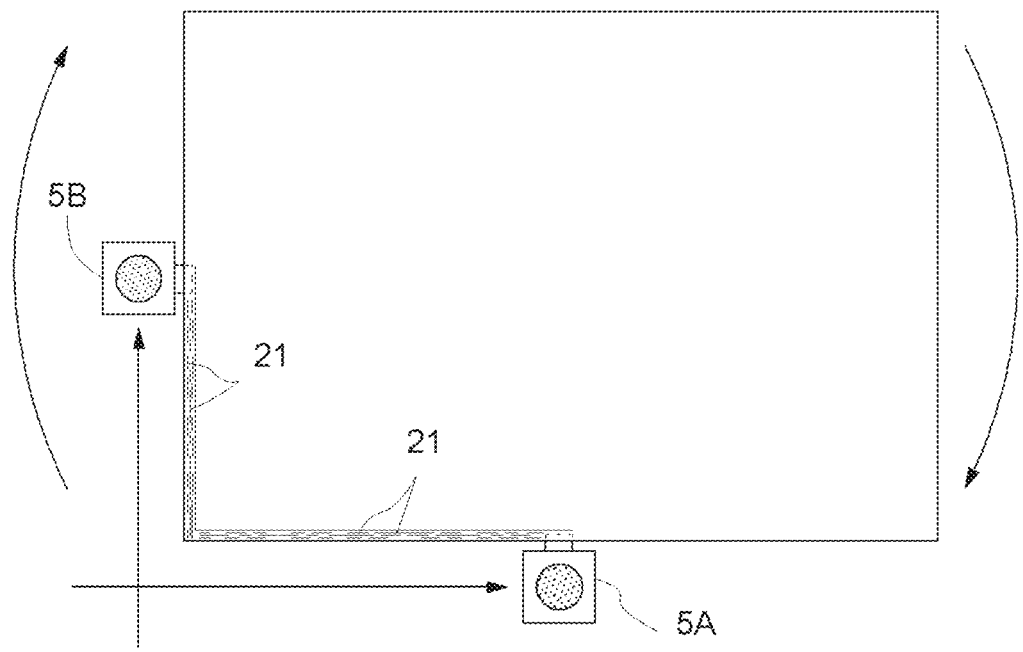
FIG. 14A illustrates operation in an initial-stage filling state of the periphery sealing metal material in the second embodiment.
Figure 14B:
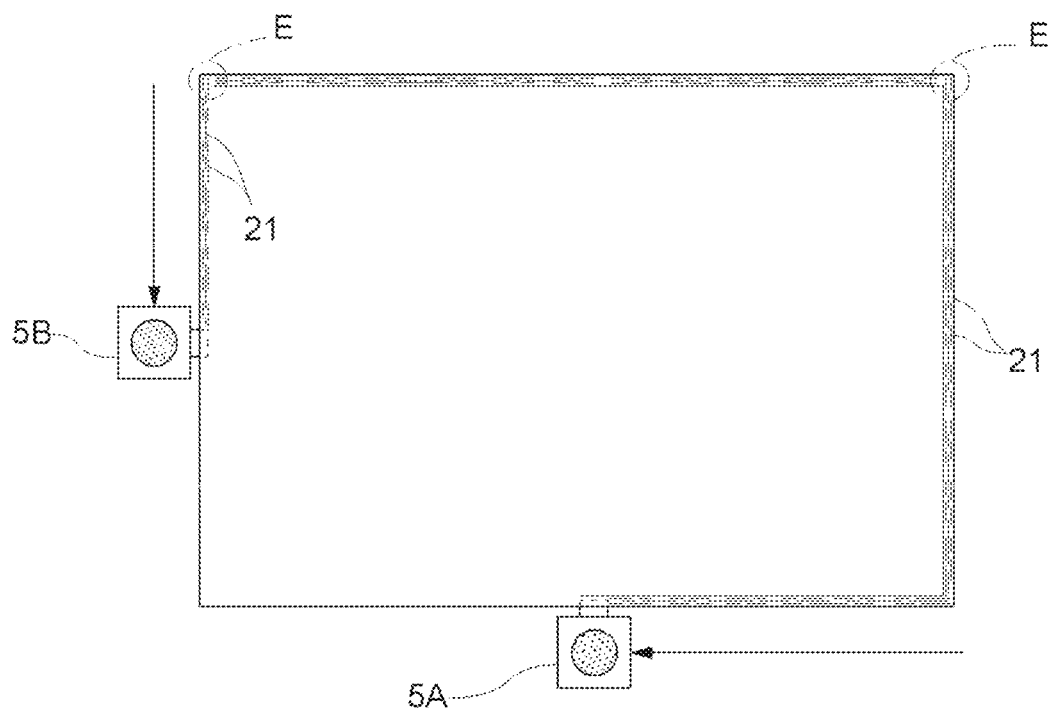
FIG. 14B illustrates operation in a later-stage filling state of the periphery sealing metal material in the second embodiment.
Figure 15:
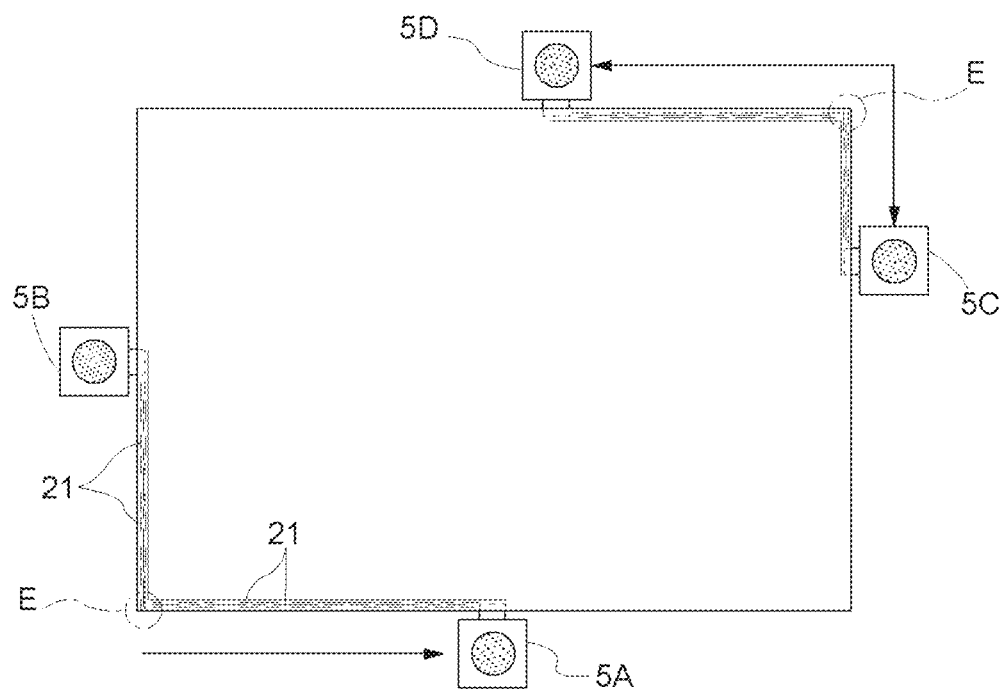
FIG. 15 illustrates operation in a filling state of the periphery sealing metal material in the third embodiment.

In addition, in the case where the introduction plate 8 passes the long-side portion first in preference to the short-side portion, as shown in FIGS. 13A and 13B, in the first embodiment, a plurality of metal streaks 21 along the longitudinal direction of the short sides appear in at least two or more locations in the short-side portions as shown at corners E enclosed by circles in FIG. 13B. As shown in FIGS. 14A and 14B, in the second embodiment, a plurality of metal streaks 21 along the longitudinal direction of the short sides appear in at least two or more locations in the short-side portions at corners E enclosed by circles in FIG. 14B. As shown in FIG. 15, also in the third embodiment, a plurality of metal streaks 21 along the longitudinal direction of the short sides appear in at least two or more locations in the short-side portions at corners E enclosed by circles in FIG. 15.

Figure 16A:
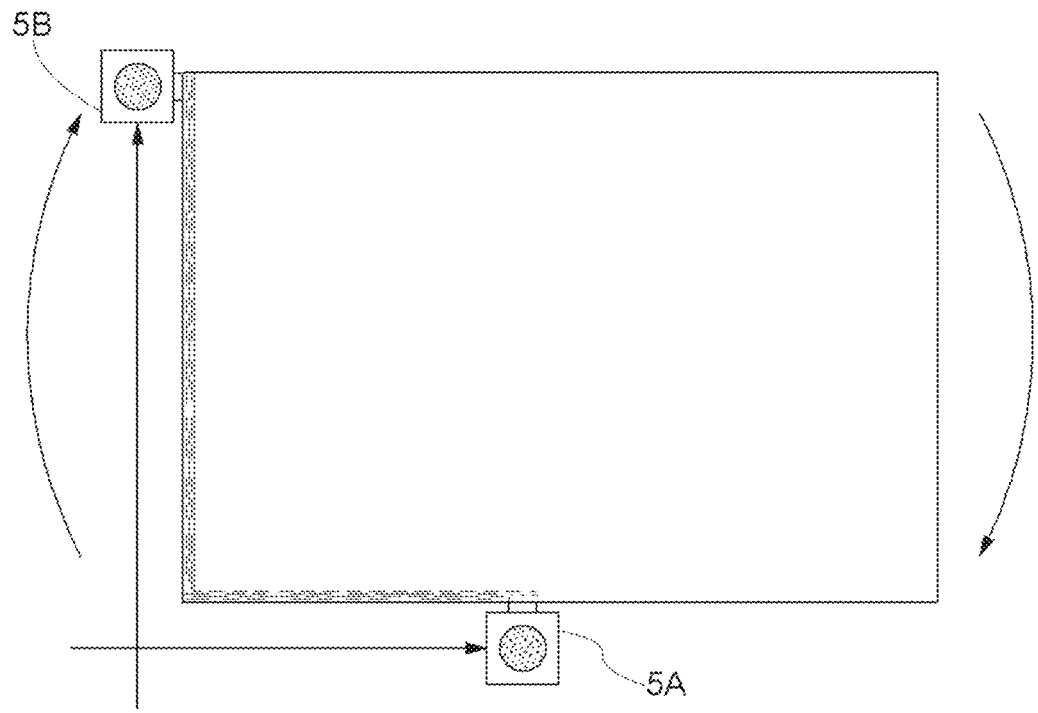
FIG. 16A illustrates operation in an initial-stage filling state of the periphery sealing metal material in the first comparative example.
Figure 16B:
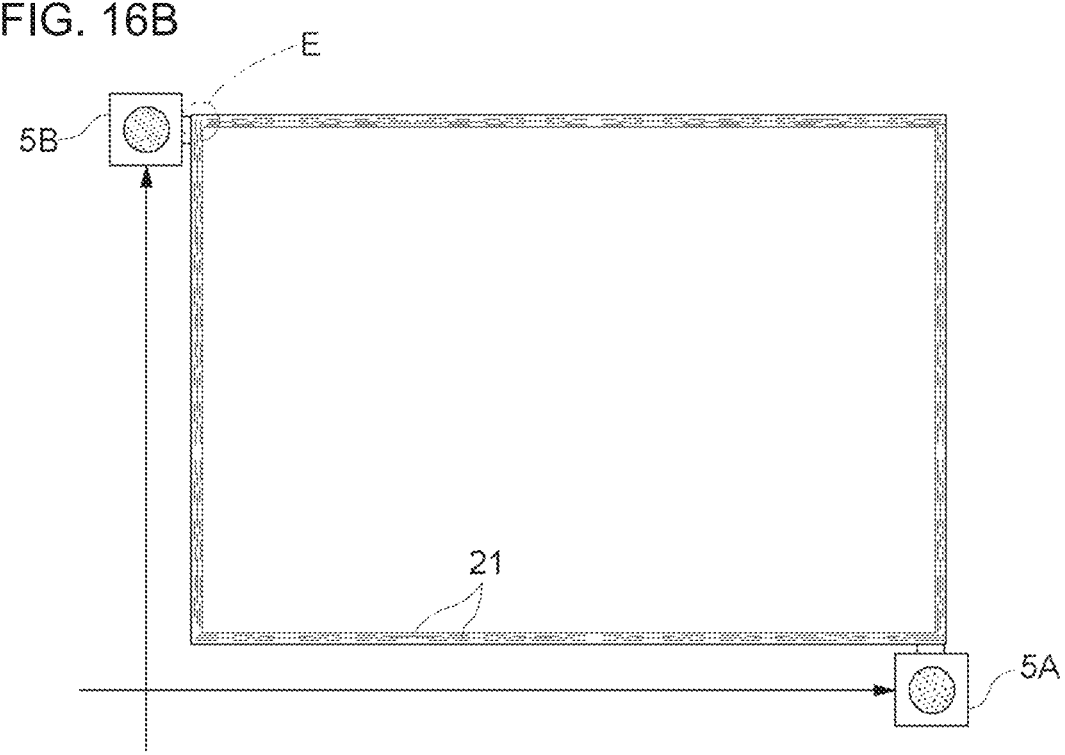
FIG. 16B illustrates operation in a later-stage filling state of the periphery sealing metal material in the first comparative example.
Figure 17A:
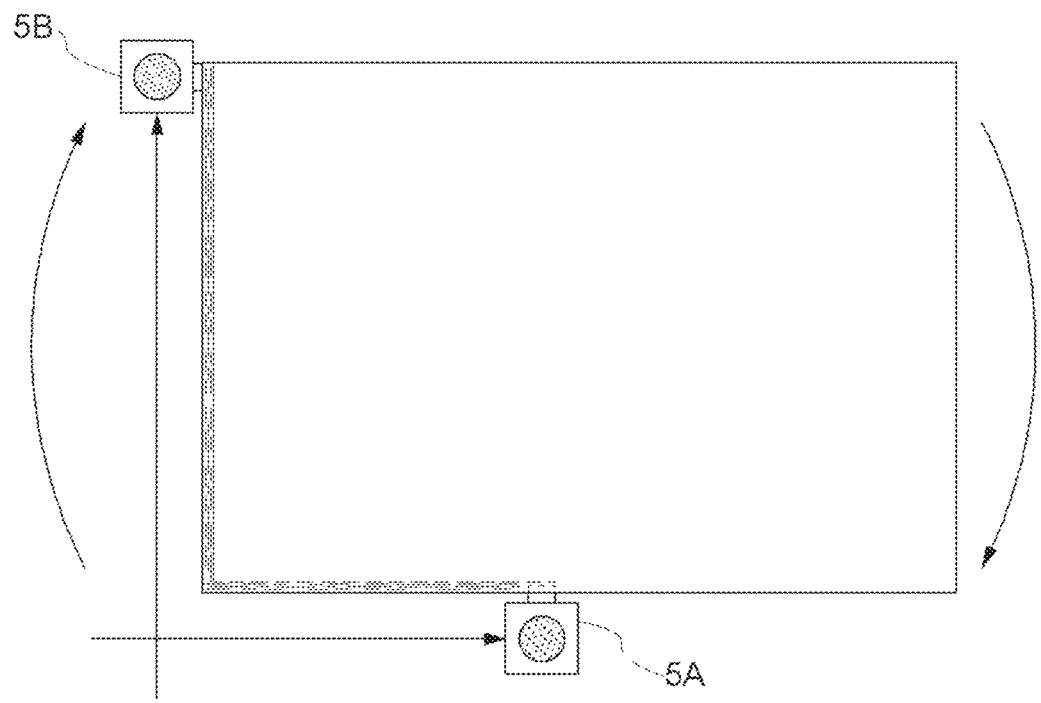
FIG. 17A illustrates operation in an initial-stage filling state of the periphery sealing metal material in the second comparative example.
Figure 17B:
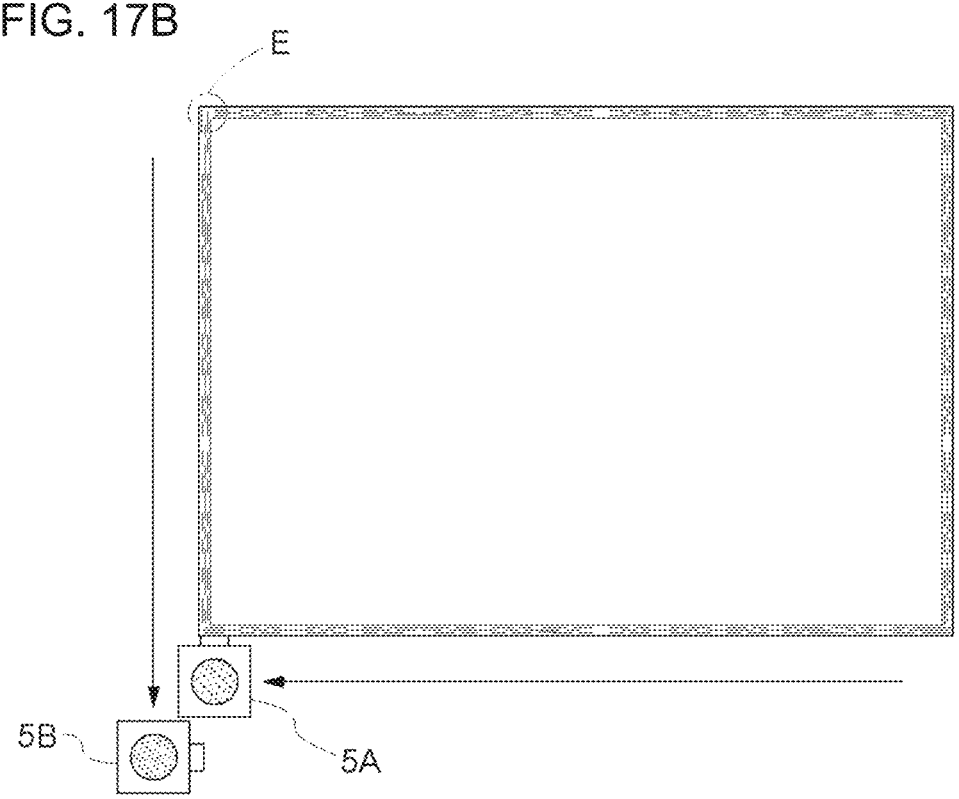
FIG. 17B illustrates operation in a later-stage filling state of the periphery sealing metal material in the second comparative example.
Figure 18A:
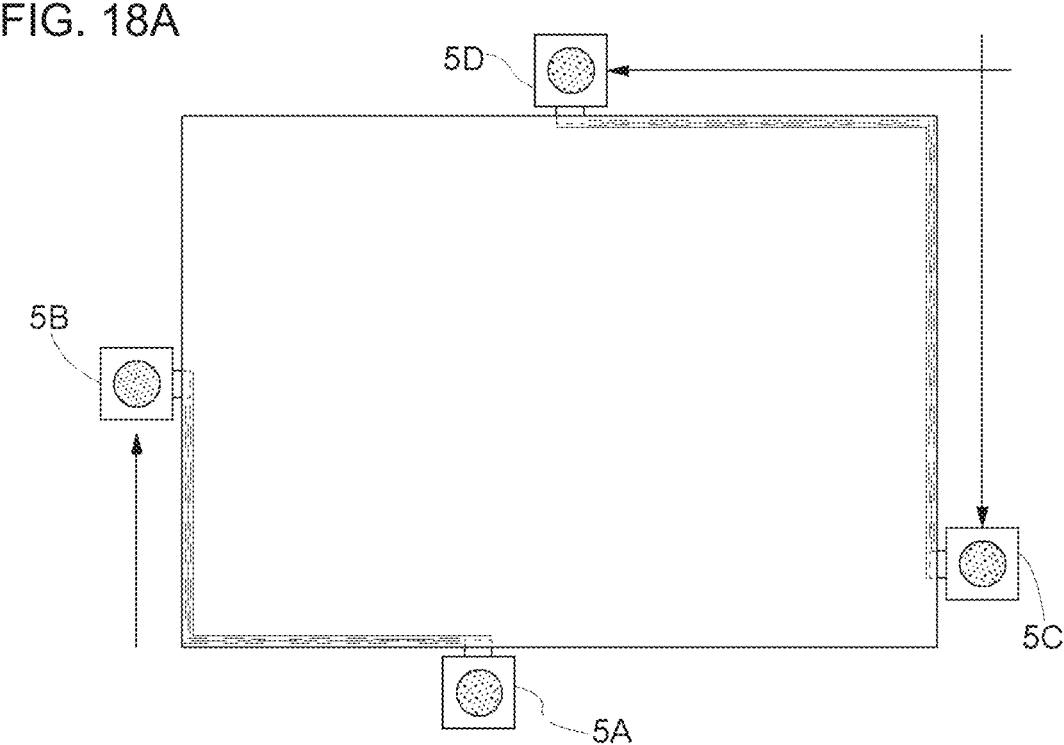
FIG. 18A illustrates operation in an initial-stage filling state of the periphery sealing metal material in the third comparative example.
Figure 18B:
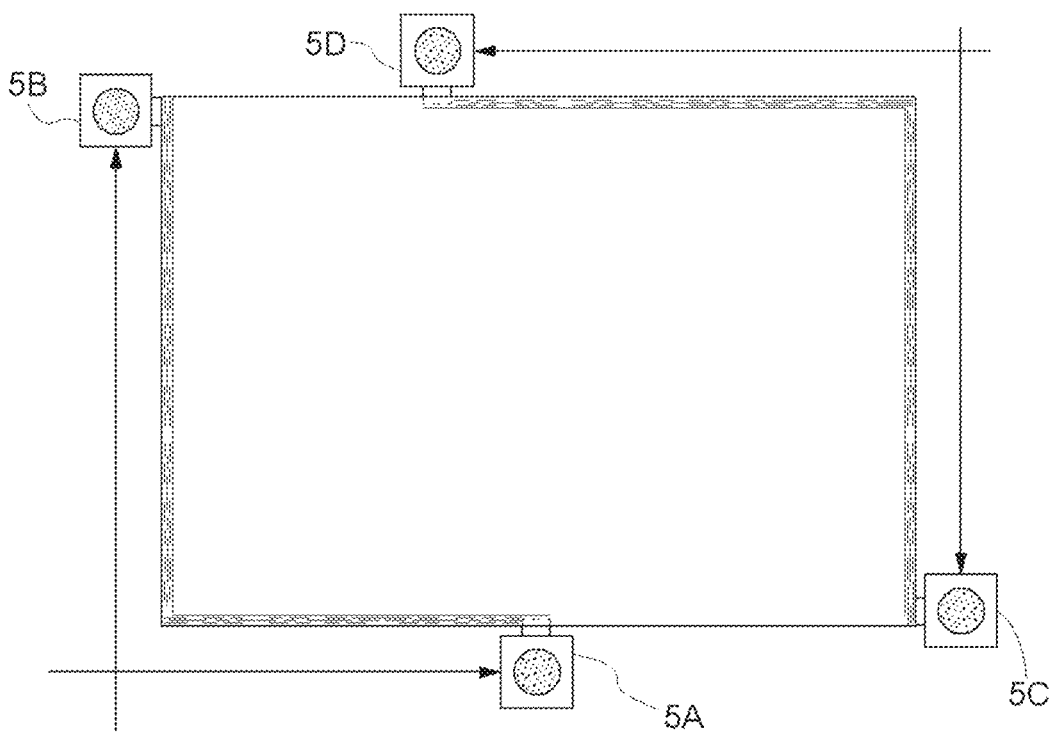
FIG. 18B illustrates operation in a later-stage filling state of the periphery sealing metal material in the third comparative example.

In comparative examples with respect to the above cases, as a precondition, it is assumed that the plurality of metal introduction devices have the same supply speed for the periphery sealing metal material 3 and the introduction plate 8 passes the short-side portion first in preference to the long-side portion among the four peripheral sides of the glass panel P. In this case, in a first comparative example shown in FIGS. 16A and 16B, a plurality of metal streaks 21 along the longitudinal direction of the short sides appear only in one location in the short side portions as shown at a corner E enclosed by a circle in FIG. 16B. In addition, in a second comparative example shown in FIGS. 17A and 17B, a plurality of metal streaks 21 along the longitudinal direction of the short sides appear in only one location in the short-side portions as shown at a corner E enclosed by a circle in FIG. 17B. In a third comparative example shown in FIGS. 18A and 18B, a plurality of metal streaks 21 along the longitudinal direction of the short sides do not appear in the short side portions at any corner in FIG. 18B.

Other Embodiments

Other embodiments will be described below.

In other embodiments below, the same members as those in the above embodiments are denoted by the same reference characters.

<1> The opened end part 14 formed by slope surfaces provided at parts opposed to each other in the peripheral portion V1 of the pair of glass plates 1A, 1B opposed to each other may be provided at a part needed for insertion of the introduction plate 8 for a metallic sealing material (periphery sealing metal material 3).

That is, the opened end part 14 is formed only at a corner part serving as a base portion for starting to introduce the melted metallic sealing material (periphery sealing metal material 3), and, for example, in the case where the width of the metallic sealing material (periphery sealing metal material 3) is 5 mm, the suction hole 4 is formed in the vicinity of the opened end part 14 at a location separated by 50 mm from the corner part serving as the base portion along two vertical and horizontal sides.

<2> The opened end part 14 may be formed by curved surfaces, instead of planar slope surfaces as shown in the drawing.

It is noted that, although the reference characters have been given for convenience of matching with the drawings as described above, such reference characters are not intended to limit the present invention to the configurations shown in the accompanying drawings. In addition, it should be naturally understood that various embodiments can be made without departing from the scope of the present invention.

INDUSTRIAL APPLICABILITY

The present invention is applicable as a glass panel having high thermal insulation performance. For example, the present invention is applicable as a thermal insulation glass panel required to have long-term durability for a door, a wall part, etc., of a building or a vehicle (window glass of an automobile, a rail road vehicle, a vessel, etc.) or of various devices such as a refrigerator and a heat insulating device.

DESCRIPTION OF THE REFERENCE CHARACTERS 1A, 1B glass plate
2 spacer (pillar)
3 periphery sealing metal material (solder)
4 suction hole
4e edge
5 metal introduction device
5A first metal introduction device
5B second metal introduction device
5C third metal introduction device
5D fourth metal introduction device
6 surface plate
6a high portion
6b low portion
7 supply tower
8 introduction plate
8A bent portion
9 crucible portion
10 electric heater
11 introduction path
12 rail member
13 movement mechanism
14 opened end part
15 suction hole sealing metal material (solder)
16 protruding portion
21 metal streak
A first corner
C second corner
V gap
V1 peripheral portion
Vab first side
Vad second side
Vbc third side
Vcd fourth side
P glass panel
Dw protruding portion diameter
Dg protruding portion thickness
Tg glass plate thickness
Pd spacer pitch (interval)
Rw periphery sealing metal width
Sw suction hole diameter

The invention claimed is:
1. A glass panel comprising:
a pair of glass plates each having a rectangular shape comprising two short sides, two longer sides that are longer than the short sides and four corners;
a gap formed by providing a spacer between the pair of glass plates; and a periphery sealing metal material directly filling a peripheral portion of the pair of glass plates so as to join the glass plates and seal the gap in an airtight state, wherein the periphery sealing metal material contains streaks along an extending direction of the short sides at two or more corners of the four corners, the periphery sealing metal material has surfaces directly in contact with the pair of glass plate, and the streaks are provided on at least one of the surfaces.

2. A method for manufacturing the glass panel according to claim 1, comprising:

providing a first metal introduction device and a second metal introduction device which individually move along the two short sides and the two longer sides and fill the peripheral portion of both glass plates with the melted metal material;

moving the first metal introduction device from a first corner of the corners, at which one of the two short sides and one of the two longer sides intersect each other, in an extending direction of the one of the longer sides, while performing filling with the metal material;

moving, before the metal material filling the first corner is solidified, the second metal introduction device from the first corner in an extending direction of the one of the two short sides, while performing filling with the metal material;

rotating, after the one of the two longer sides and the one of the two short sides are filled with the metal material, the pair of glass plates by 180 degrees;

moving the first metal introduction device from a second corner where the other one of the two short sides and the other one of the two longer sides intersect in an extending direction of the other one of the two longer sides, while performing filling with the metal material; and moving, before the metal material filling the second corner is solidified, the second metal introduction device from the second corner in an extending direction of the other one of the two short sides, while performing filling with the metal material.

3. A method for manufacturing the glass panel according to claim 1, comprising:

providing, at a first corner of the corners, a first metal introduction device and a second metal introduction device which individually move along one of the short sides and one of the longer sides intersecting each other at the first corner and fill the peripheral portion of the pair of glass plates with the melted metal material;

providing, at a second corner of the corners diagonal to the first corner, a third metal introduction device and a fourth metal introduction device which individually move along a the other one of the short sides and the other one of the longer sides intersecting each other at the second corner of the glass plates and fill the peripheral portion of the pair of glass plates with the melted metal material;

first, moving the first metal introduction device from the first corner toward another end of the one of the longer sides, while performing filling with the metal material;

second moving, before the metal material filling the first corner is solidified, the second metal introduction device from the first corner toward another end of the one of the short sides, while performing filling with the metal material;

third moving the third metal introduction device from the second corner toward another end of the other one of the longer sides, while performing filling with the metal material; and fourth moving, before the metal material filling the second corner is solidified, the fourth metal introduction device from the second corner toward another end of the other one of the short sides, while performing filling with the metal material.

4. A method for manufacturing the glass panel according to claim 1, comprising:

providing a first metal introduction device and a second metal introduction device which individually move along the two short sides and two longer sides, and fill the peripheral portion of the pair of glass plates with the melted metal material;

moving the first metal introduction device from a first corner at which one of the two short sides and one of the two longer sides intersect each other of the glass plates, toward another end of the one of the two longer sides, while performing filling with the metal material;

moving, before the metal material filling the first corner is solidified, the second metal introduction device from the first corner toward another end of the one of the short sides, while performing filling with the metal material;

rotating, after the one of the longer sides and the one of the short sides are filled with the metal material, the pair of glass plates by 180 degrees so that the first corner and a second corner diagonal thereto are switched with each other; and moving, before the metal material filling the another end of the one of the short sides is solidified, the first metal introduction device is moved from the another end of the one of the short sides toward the second corner, while performing filling with the metal material; and moving, before the metal material filling the another end of the one of the longer sides is solidified, the second metal introduction device from the another end of the one of the longer sides toward the second corner, while performing filling with the metal material.

5. A method for manufacturing the glass panel according to claim 3, comprising:

fifth moving, after the second moving and before the third moving, the pair of glass plates in parallel.

6. The glass panel according to claim 1, wherein:

the streaks are bubbles or a metal oxide.

* * * * *